United States Patent
Lucka et al.

(10) Patent No.: US 11,168,649 B2
(45) Date of Patent: Nov. 9, 2021

(54) SYSTEMS AND METHODS FOR DETERMINING QUICK CONNECTOR SECUREMENT IN VEHICLE EVAPORATIVE EMISSIONS SYSTEMS

(71) Applicant: Ford Global Technologies, LLC, Dearborn, MI (US)

(72) Inventors: Kevin Lucka, Southfield, MI (US); Aed M. Dudar, Canton, MI (US); Gregory Barilovich, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 145 days.

(21) Appl. No.: 16/522,582

(22) Filed: Jul. 25, 2019

(65) Prior Publication Data
US 2021/0025355 A1  Jan. 28, 2021

(51) Int. Cl.
| | |
|---|---|
| *G06T 7/00* | (2017.01) |
| *F02M 25/08* | (2006.01) |
| *F16L 37/084* | (2006.01) |
| *G06T 7/90* | (2017.01) |

(52) U.S. Cl.
CPC ....... *F02M 25/0872* (2013.01); *F16L 37/084* (2013.01); *G06T 7/001* (2013.01); *G06T 7/90* (2017.01); *F16L 2201/10* (2013.01)

(58) Field of Classification Search
CPC .............. F02M 25/0872; F16L 37/084; F16L 2201/10; G06T 7/001; G06T 7/90
USPC ....................................................... 382/152
See application file for complete search history.

(56) References Cited

U.S. PATENT DOCUMENTS

| | | | | |
|---|---|---|---|---|
| 5,662,359 A | * | 9/1997 | Kargula | F16L 37/0987 285/307 |
| 2003/0037838 A1 | * | 2/2003 | Nakajima | B60K 15/03519 141/65 |
| 2004/0154532 A1 | * | 8/2004 | Ramsay | B05B 9/0403 118/300 |
| 2014/0284915 A1 | | 9/2014 | Arnold et al. | |
| 2014/0293601 A1 | * | 10/2014 | Beausoleil | F21V 21/088 362/235 |

(Continued)

OTHER PUBLICATIONS

"Coating Changes Color Under Pressure," Paint Square Website, Available Online at https://www.paintsquare.com/news/?fuseaction=view&id=11422, May 15, 2014, 2 pages.

(Continued)

*Primary Examiner* — Ali Bayat
(74) *Attorney, Agent, or Firm* — Geoffrey Brumbaugh; McCoy Russell LLP

(57) ABSTRACT

A quick connect fitting for coupling a first component of an evaporative emissions system of a vehicle to a second component of the evaporative emissions system is provided. In one example, the quick connect fitting includes an indicator section that includes a color-changing material that changes color based on an extent of deformation of the color-changing material, where secure coupling of the first component to the second component is dependent on the extent of deformation. In this way, it may be readily determined as to whether a particular quick connect fitting is securely connected, which may improve engine operation, reduce undesired emissions, and reduce warranty rates.

20 Claims, 8 Drawing Sheets

(56) References Cited

U.S. PATENT DOCUMENTS

| | | | |
|---|---|---|---|
| 2015/0129513 A1* | 5/2015 | Gilmore, Jr. | B01D 35/02 |
| | | | 210/806 |
| 2016/0150612 A1* | 5/2016 | Beausoleil | G08B 5/36 |
| | | | 315/294 |
| 2017/0216548 A1 | 8/2017 | Gerhardt et al. | |
| 2017/0321825 A1* | 11/2017 | Schuster | F16L 37/084 |
| 2019/0267933 A1* | 8/2019 | Janowski | H01L 31/02008 |
| 2019/0301648 A1* | 10/2019 | Leckner | F16L 37/084 |

OTHER PUBLICATIONS

Hanly, S., "Pressure Sensitive Materials: Paint, Film, and Polymers Overview," Mide Website, Available Online at https://blog.mide.com/pressure-sensitive-material-overview, May 24, 2017, 12 pages.

* cited by examiner

SYSTEMS AND METHODS FOR DETERMINING QUICK CONNECTOR SECUREMENT IN VEHICLE EVAPORATIVE EMISSIONS SYSTEMS

FIELD

The present description relates generally to systems and methods for assessing whether a quick connector included in a vehicle evaporative emissions system is properly secured.

BACKGROUND/SUMMARY

Vehicle evaporative emissions control systems function to adsorb refueling, diurnal and running loss fuel vapors into a carbon canister. Such evaporative emissions systems may include one or more quick connects that tie the system together. While some evaporative emissions systems parts may come pre-assembled from a supplier, other connections may have to be made at a vehicle assembly plant. For example, assembly line workers may be instructed in how to properly secure such quick connections. However, issues such as human error, assembly line speed and ergonomic issues (e.g. difficulty in accessibility to the quick connect(s)) may contribute to such quick connections not being effectively made. As one example, a worker may assemble a quick connection in a manner which introduces a temporary seal that enables the vehicle to pass an "end of line" test for the vehicle evaporative emissions system. However, once the vehicle is on the road, issues including but not limited to vibrations and thermal cycling may result in the temporary seal becoming unsealed, which may result in an onboard diagnostic being set.

United States Patent Application Publication No. 20140284915 discloses a quick connector for use in a vehicle system. The quick connector disclosed therein includes a twist lock mechanism that includes a redundant latch and which produces two audible and/or tactile clicks during the installation process, thereby providing an indication that the locking quick connect assembly has been properly installed. However, the inventors herein have recognized potential issues with such connectors. For example, despite producing an audible sound, a worker (or in some cases a machine) may not readily detect such a sound during installation due to noises from a surrounding environment, or due to lack of attention. Furthermore, the connector disclosed by United States Patent Application Publication No. 20140284915 does not provide reliable visual cues in response to a complete assembly of the quick connect. For example, it may be challenging to reliably assess whether the redundant latch is effectively secured.

The inventors herein have recognized the above-mentioned issues, and have herein developed systems and methods to at least partially address them. In one example, a quick connect fitting for coupling a first component of an evaporative emissions system of a vehicle to a second component of the evaporative emissions system comprises an indicator section that includes a color-changing material that changes color based on an extent of deformation of the color-changing material. Secure coupling of the first component to the second component may be dependent on the extent of deformation. In this way, it may be readily determined as to whether the first and the second component of the evaporative emissions system are effectively secured to one another via the quick connect fitting.

As an example of the quick connect fitting, the extent of deformation may pertain to a length of the color changing material. Additionally or alternatively, the extent of deformation may pertain to a degree of curvature of the color changing material. The color changing material may be of a first color under conditions where the first component is not securely coupled to the second component, and may be of a second color under conditions where the first component is securely coupled to the second component.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for determining whether quick connectors included in a vehicle evaporative emissions system, for example, are properly connected or not. While the description relates to quick connectors included in a vehicle evaporative emissions system, it may be understood that the methodology discussed herein for determining whether quick connectors are properly connected may be applied to other areas of vehicle systems (e.g. brake lines, A/C lines, etc.), without departing from the scope of this disclosure. Specifically, the description relates to use of color changing materials that change color upon deformation (e.g. tension, twisting, contraction, expansion, etc.) in order to infer proper or improper quick connector connection.

Figure 1:
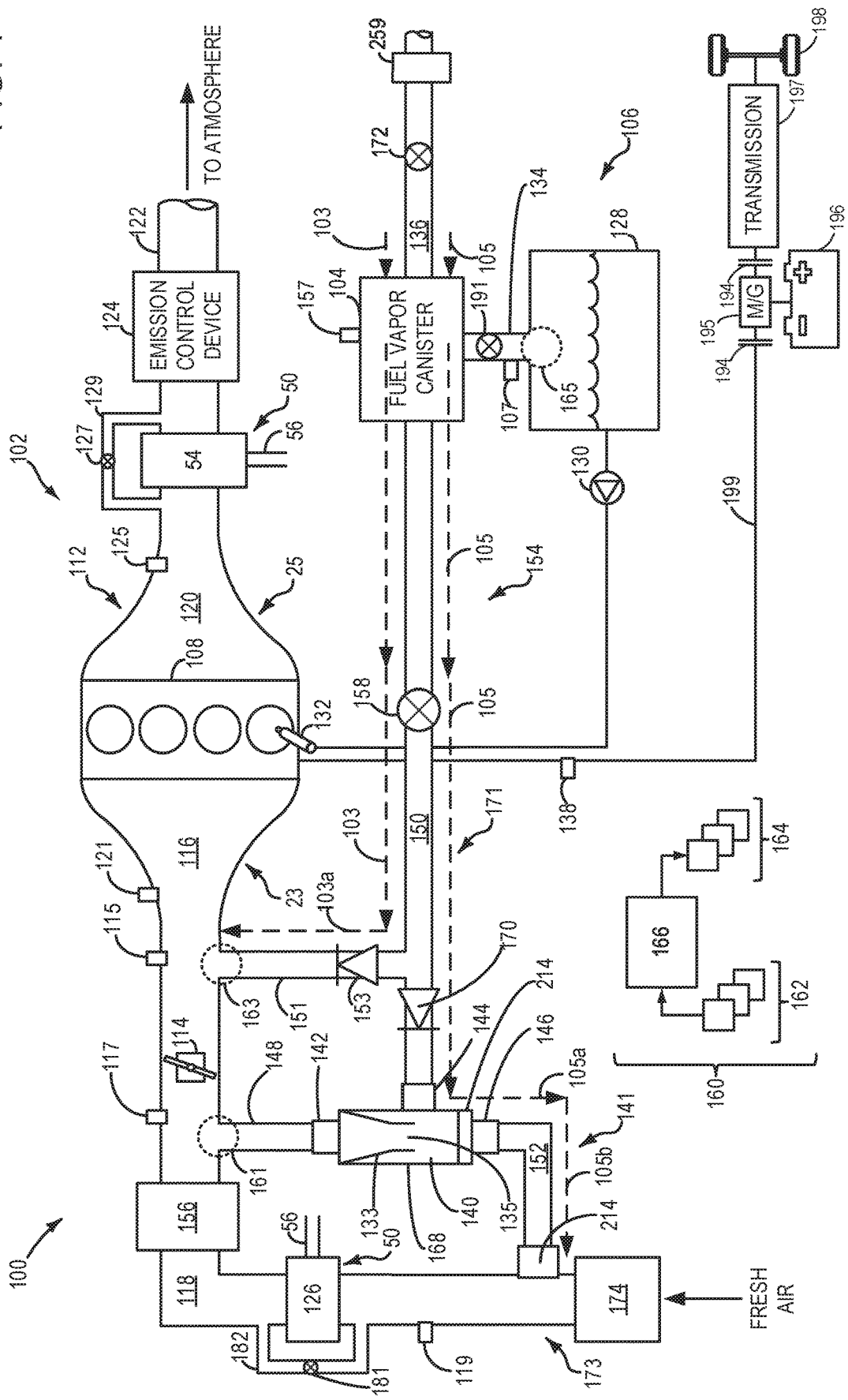
FIG. 1 shows a schematic diagram of a multi-path fuel vapor recovery system of a vehicle system.
Figure 2:
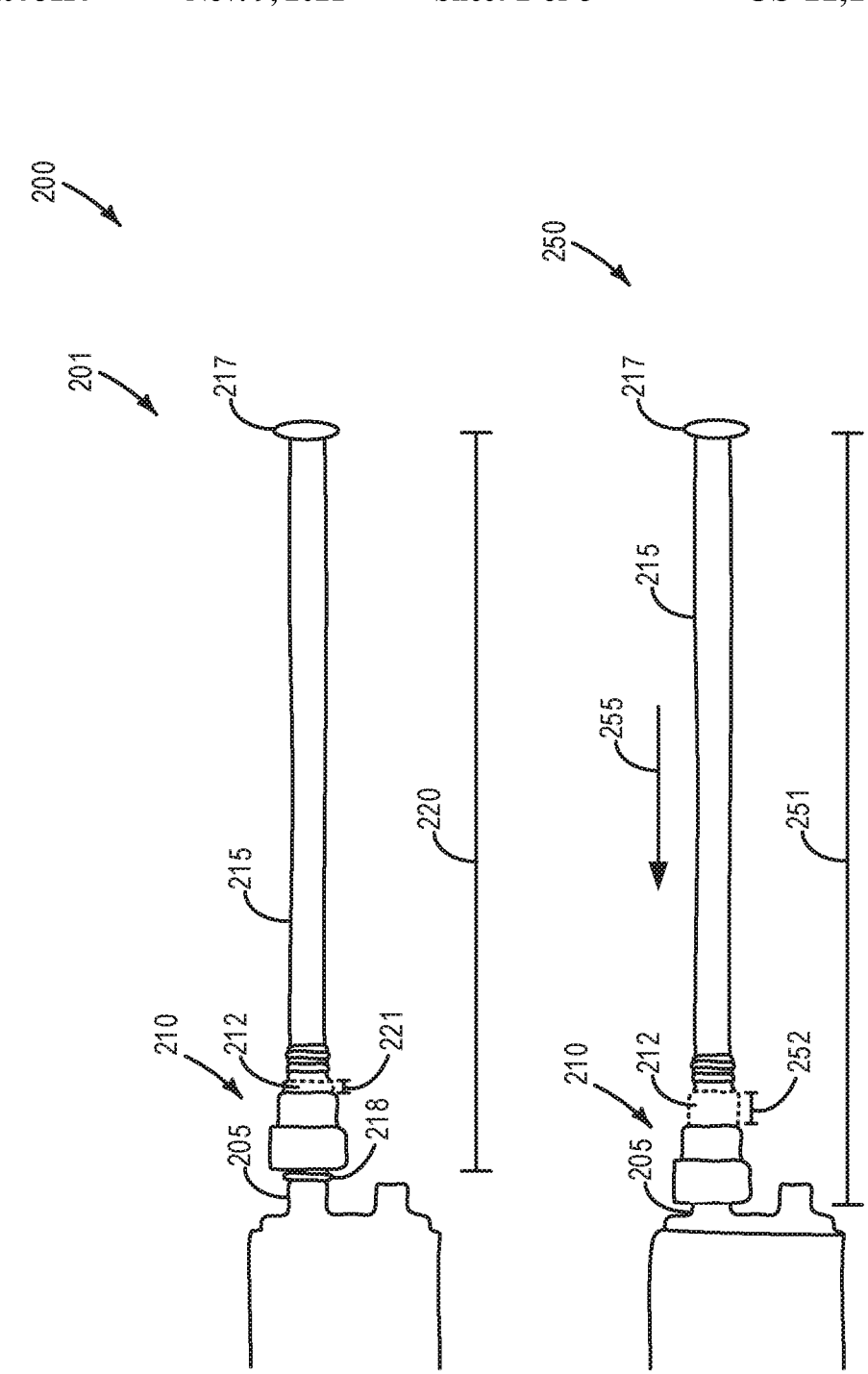
FIG. 2 depicts an example illustration of how a color changing material included as part of a quick connector may be used to infer whether the quick connector is properly connected or not.
Figure 3:
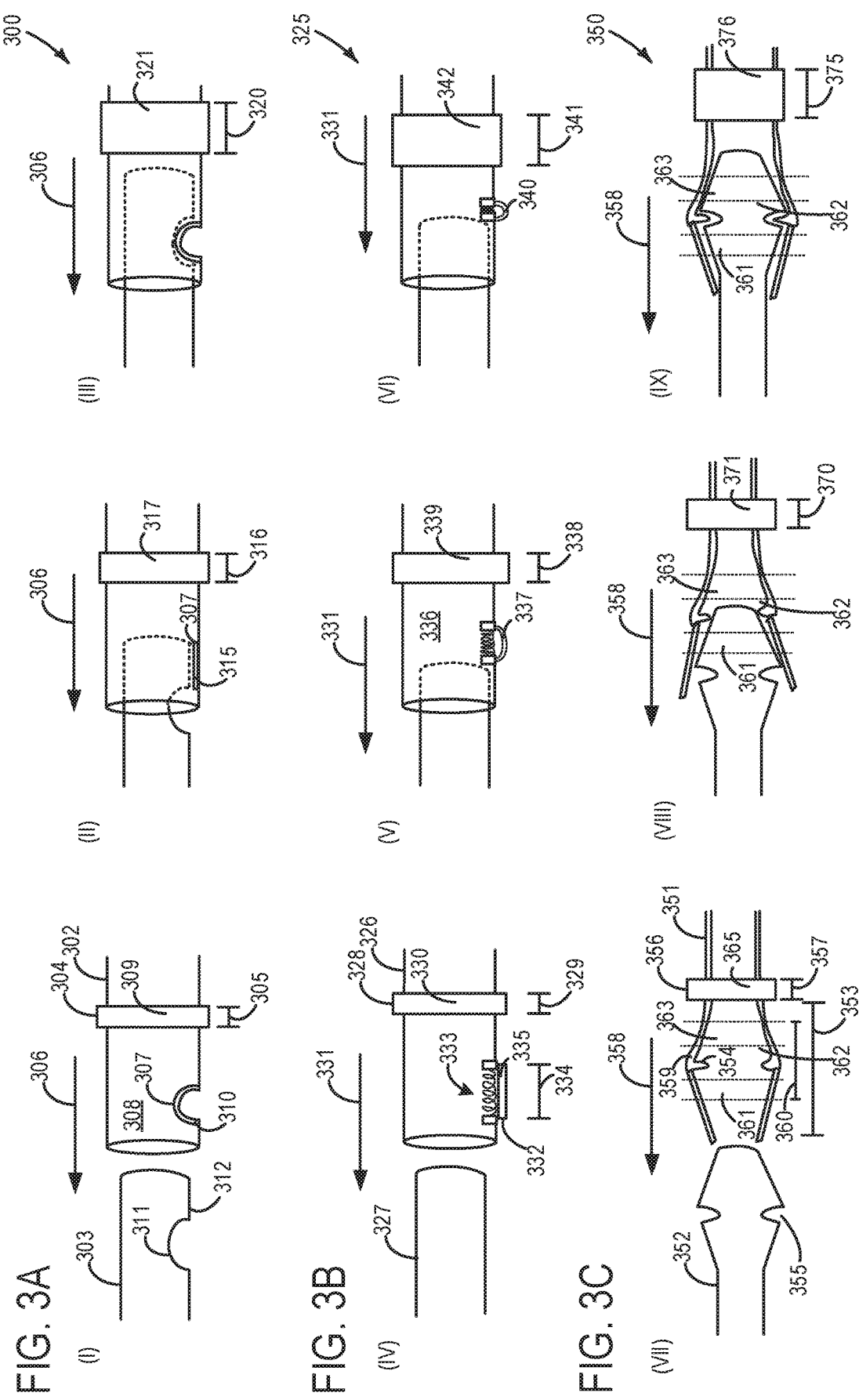
FIGS. 3A-3C depict several different example embodiments of quick connector systems that include color changing materials.

Accordingly, FIG. 1 depicts an example vehicle system that includes a fuel system and an engine system coupled to an evaporative emissions system. Depicted at FIG. 1 are example locations where quick connectors may be used to connect lines or conduits included in the evaporative emissions system. FIG. 2 depicts an example illustration of how a color changing material included in a quick connect fitting may be relied upon for inferring whether the quick connect fitting is properly or effectively secured to another quick connect fitting. Further examples of how color changing materials may be used as part of quick connector systems to infer proper or improper connection are depicted at FIGS. 3A-3C.

Figure 4:
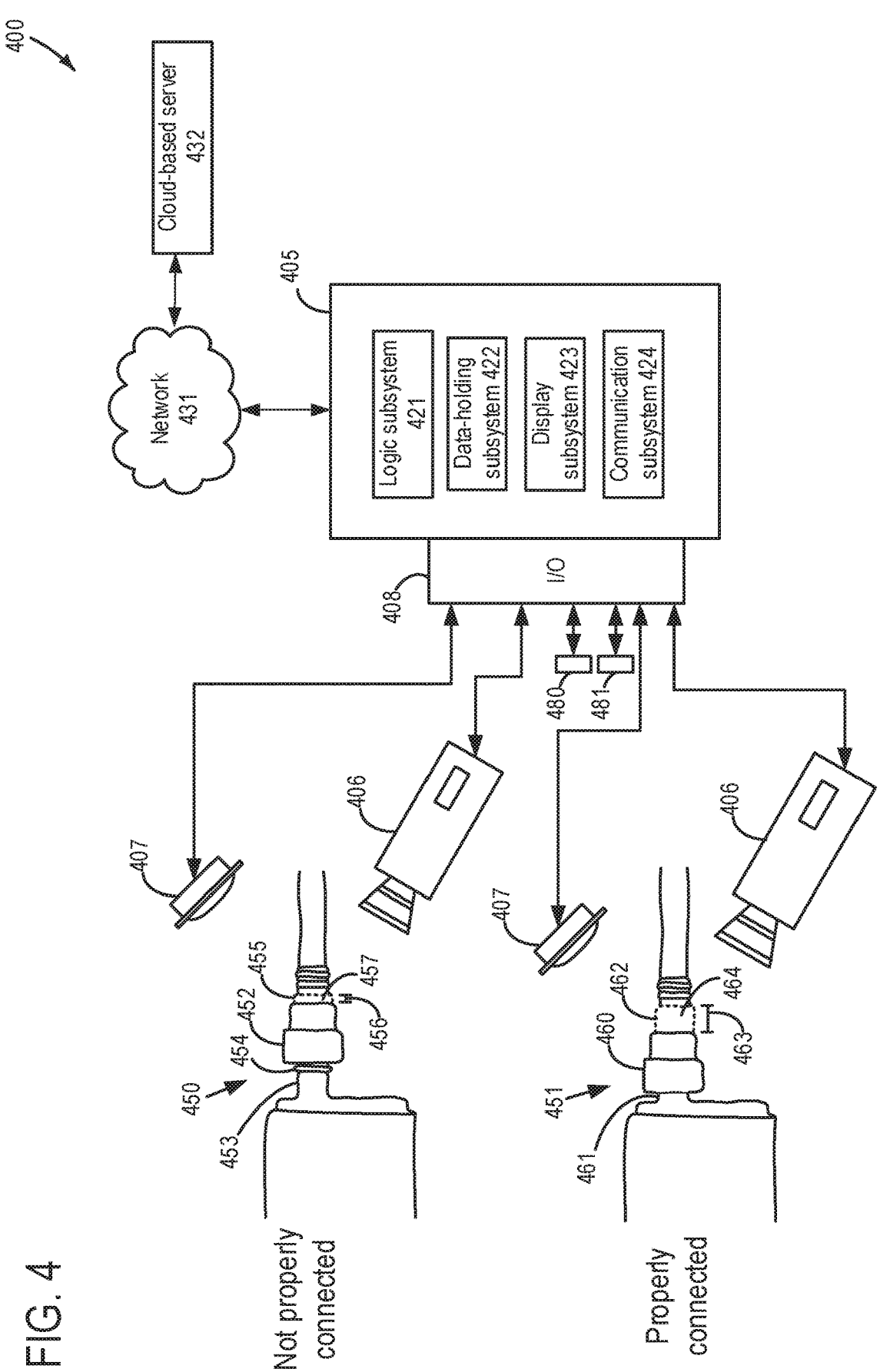
FIG. 4 depicts an example illustration of a color vision system that may be used to infer whether a quick connector is properly connected, based on a static color image and/or based on color change dynamics.
Figure 5:
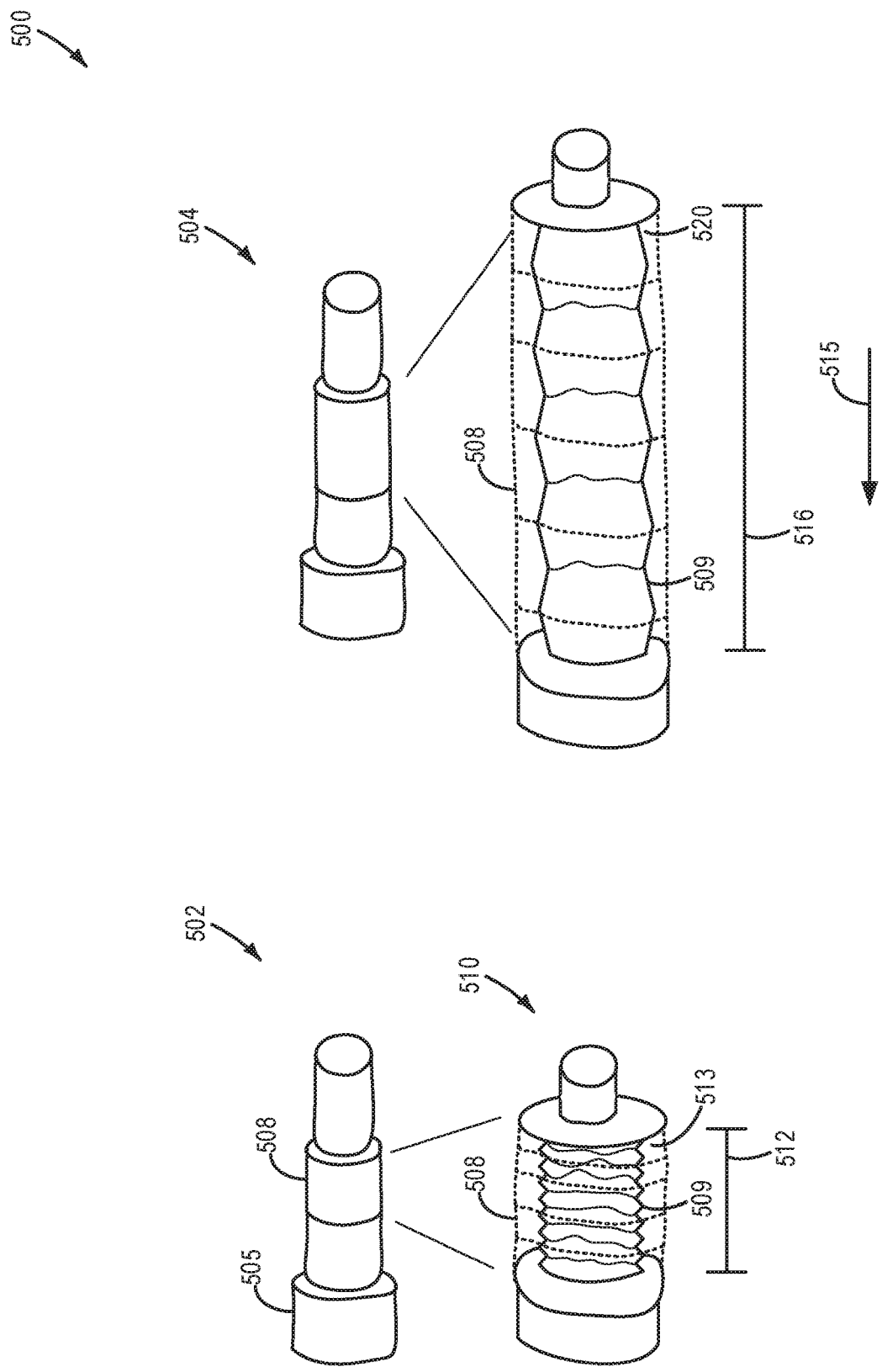
FIG. 5 depicts an example illustration of how a color changing material that changes color as tension is applied to the color changing material may be included as part of a female quick connector.
Figure 6:
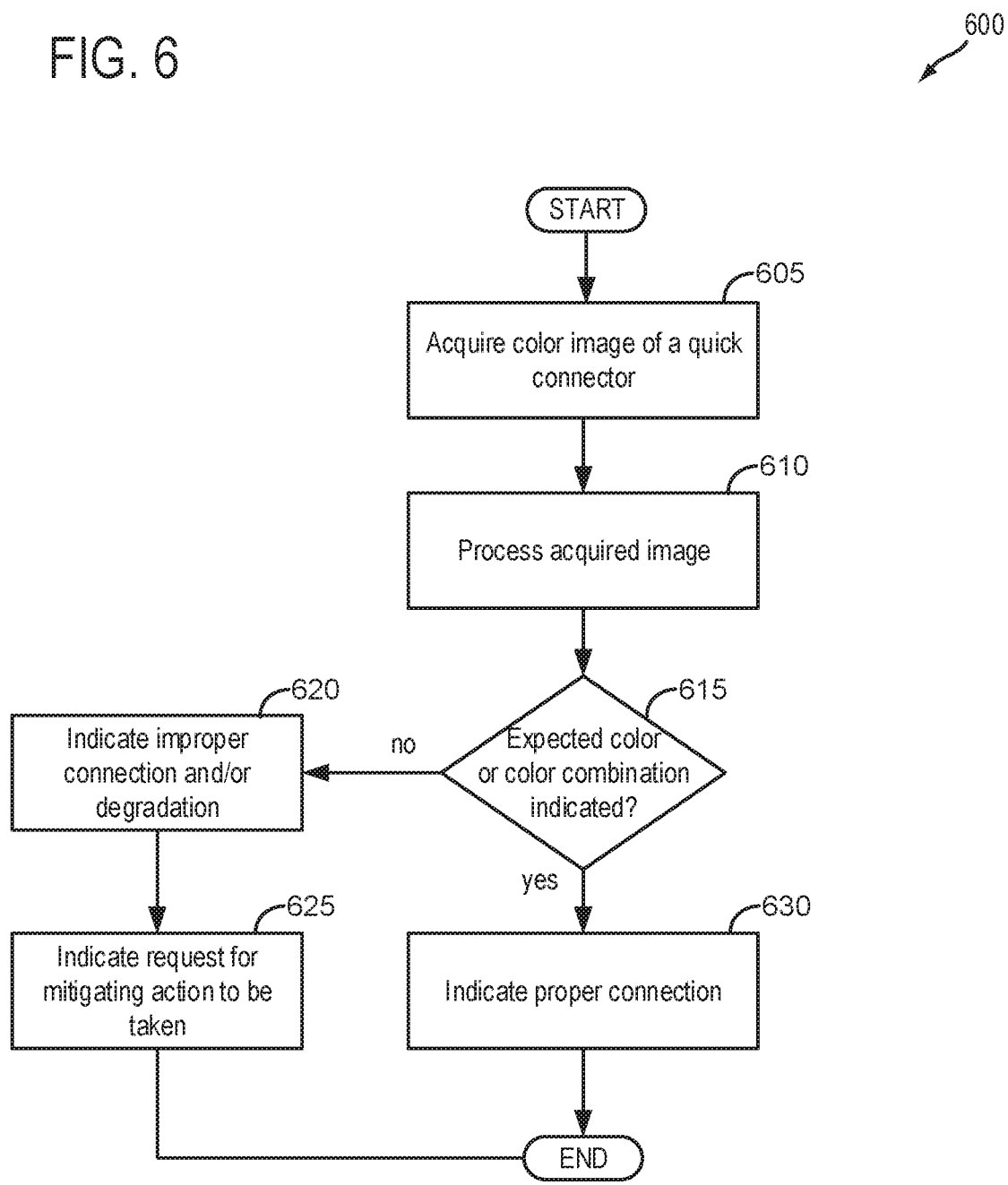
FIG. 6 depicts a high-level example methodology for determining whether a particular quick connector that includes at least one area of color changing material is properly connected based on a color or color combination.
Figure 7:
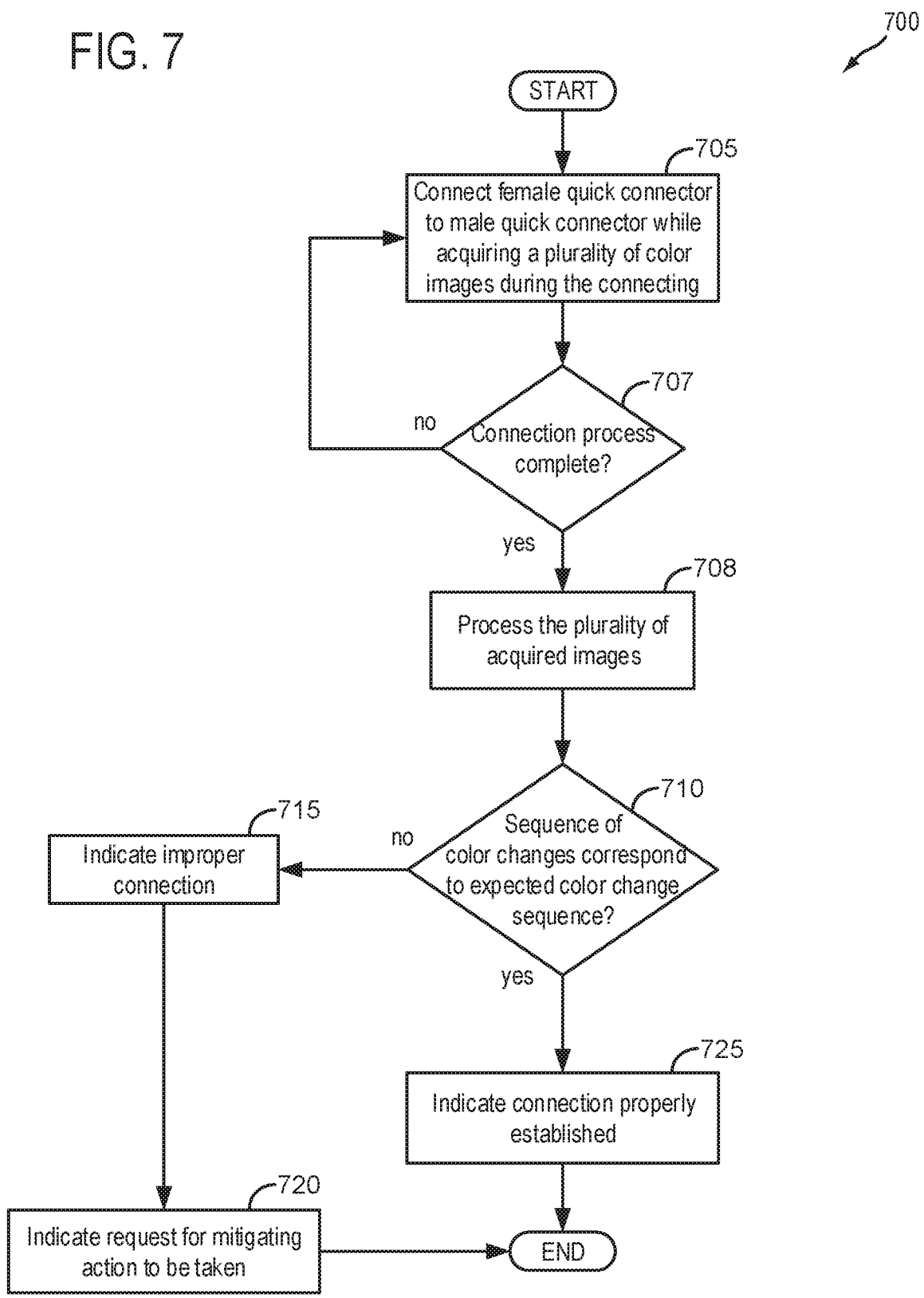
FIG. 7 depicts a high-level example methodology for monitoring dynamic color changes of a color changing material included as part of a quick connector during a connection process in order to infer proper or improper assembly.
Figure 8:
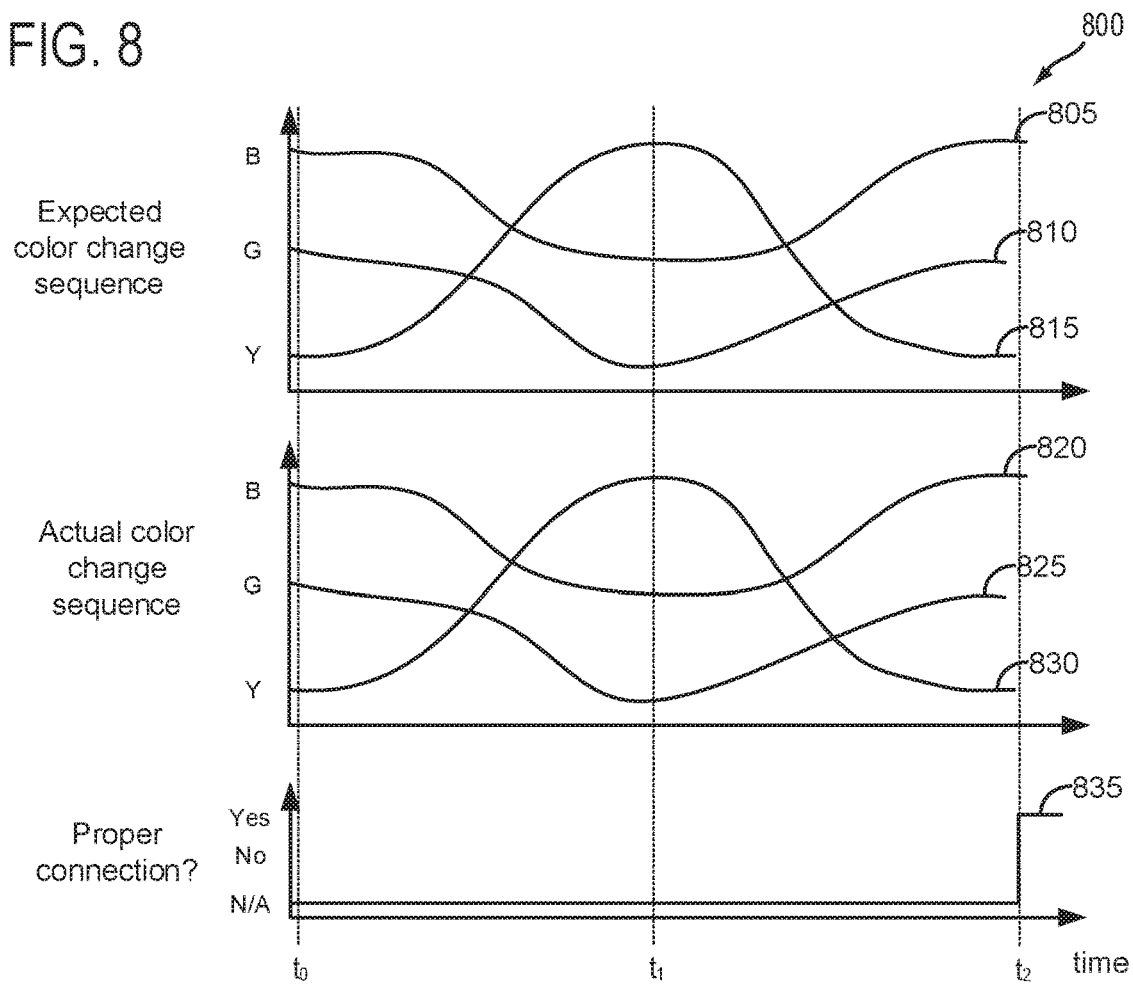
FIGS. 8-9 depict example timelines for monitoring dynamic changes of a color changing material included as part of a quick connector during a process of connecting the quick connector.
Figure 9:
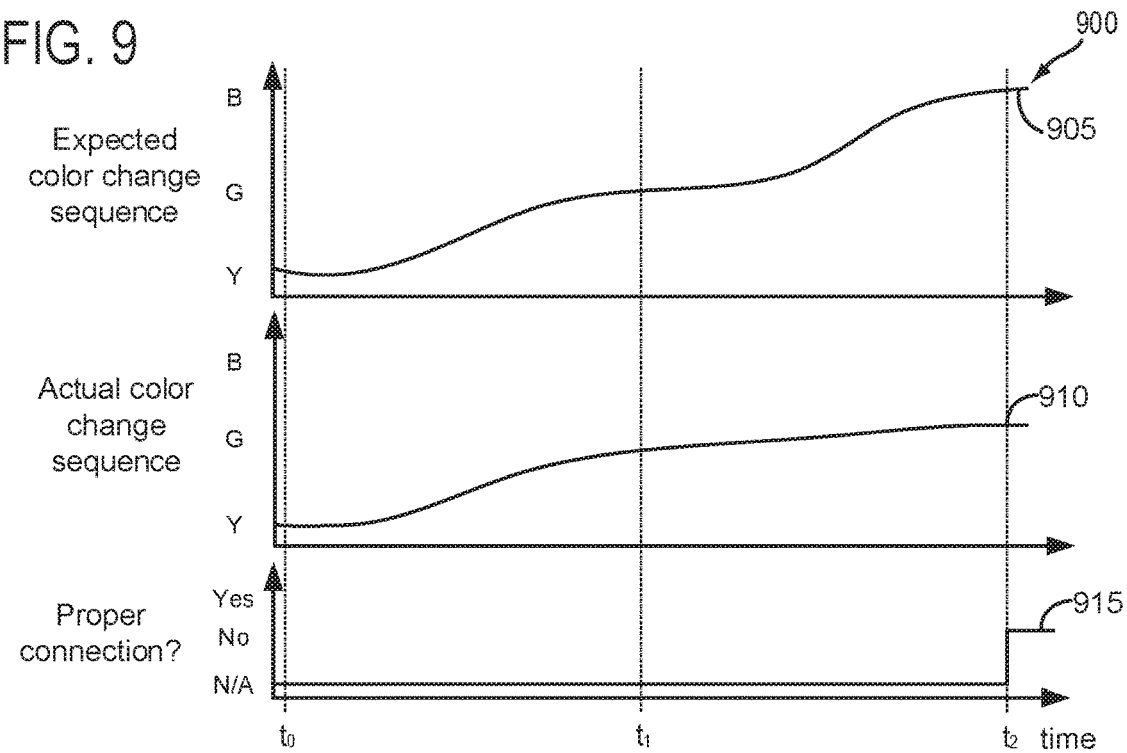

The determination of quick connector status (e.g. properly connected or not) may in some examples be indicated via use of a color vision system, such as the color vision system depicted at FIG. 4. FIG. 5 depicts an example illustration of how a color changing material may be included as part of a female quick connector, where the color changing material deforms under tension. FIG. 6 depicts an example methodology for determining whether a particular quick connector is properly connected or not, based on a static image acquired via the color vision system of FIG. 4. FIG. 7 depicts another example methodology for dynamically monitoring color changes associated with a quick connector during a connection process, to infer whether the quick connector has been properly connected, based on a plurality of images (or in some examples video) acquired via the color vision system of FIG. 4. FIGS. 8-9 depict example timelines that illustrate dynamic color changes associated with a color changing material included as part of a quick connector, during a connection process where a female portion of the quick connector is connected to a male portion of the quick connector.

Turning to the figures, FIG. 1 shows a schematic depiction of a vehicle system 100. The vehicle system 100 includes an engine system 102 coupled to a fuel vapor recovery system (evaporative emissions control system) 154 and a fuel system 106. The engine system 102 may include an engine 112 having a plurality of cylinders 108. The engine 112 includes an engine intake 23 and an engine exhaust 25. The engine intake 23 includes a throttle 114 fluidly coupled to the engine intake manifold 116 via an intake passage 118. An air filter 174 is positioned upstream of throttle 114 in intake passage 118. In some examples, throttle 114 may be electronically actuated, under control of controller 166. The engine exhaust 25 includes an exhaust manifold 120 leading to an exhaust passage 122 that routes exhaust gas to the atmosphere. The engine exhaust 122 may include one or more emission control devices 124, which may be mounted in a close-coupled position in the exhaust. One or more emission control devices may include a three-way catalyst, lean NOx trap, diesel particulate filter, oxidation catalyst, etc. It will be appreciated that other components may be included in the vehicle system, such as a variety of valves and sensors, as further elaborated below.

Throttle 114 may be located in intake passage 118 downstream of a compressor 126 of a boosting device, such as turbocharger 50, or a supercharger. Compressor 126 of turbocharger 50 may be arranged between air filter 174 and throttle 114 in intake passage 118. Compressor 126 may be at least partially powered by exhaust turbine 54, arranged between exhaust manifold 120 and emission control device 124 in exhaust passage 122. Compressor 126 may be coupled to exhaust turbine 54 via shaft 56. Compressor 126 may be configured to draw in intake air at atmospheric air pressure into an air induction system (AIS) 173 and boost it to a higher pressure. Using the boosted intake air, a boosted engine operation may be performed.

An amount of boost may be controlled, at least in part, by controlling an amount of exhaust gas directed through exhaust turbine 54. In one example, when a larger amount of boost is requested, a larger amount of exhaust gases may be directed through the turbine. Alternatively, for example when a smaller amount of boost is requested, some or all of the exhaust gas may bypass turbine 54 via a turbine bypass passage as controlled by wastegate valve 127 positioned in wastegate conduit 129. An amount of boost may additionally or alternatively be controlled by controlling an amount of intake air directed through compressor 126. Controller 166 may adjust an amount of intake air that is drawn through compressor 126 by adjusting the position of compressor bypass valve 181 positioned in compressor bypass conduit 182. In one example, when a larger amount of boost is requested, a smaller amount of intake air may be directed through the compressor bypass conduit.

Fuel system 106 may include a fuel tank 128 coupled to a fuel pump system 130. The fuel pump system 130 may include one or more pumps for pressurizing fuel delivered to fuel injectors 132 of engine 112. While only a single fuel injector 132 is shown, additional injectors may be provided for each cylinder. For example, engine 112 may be a direct injection gasoline engine and additional injectors may be provided for each cylinder. It will be appreciated that fuel system 106 may be a return-less fuel system, a return fuel system, or various other types of fuel system. In some examples, a fuel pump may be configured to draw the tank's liquid from the tank bottom. Vapors generated in fuel system 106 may be routed to fuel vapor recovery system (evaporative emissions control system) 154 via conduit 134, before being purged to the engine intake 23.

Fuel vapor recovery system 154 (herein referred to as evaporative emissions control system, or evaporative emissions system) includes a fuel vapor retaining device, depicted herein as fuel vapor canister 104. Canister 104 may be filled with an adsorbent capable of binding large quantities of vaporized HCs. In one example, the adsorbent used is activated charcoal. Canister 104 may receive fuel vapors from fuel tank 128 through conduit 134. While the depicted example shows a single canister, it will be appreciated that in alternate embodiments, a plurality of such canisters may be connected together. Canister 104 may communicate with the atmosphere through vent 136. In some examples, vent line 136 may include an air filter 259 disposed therein upstream of a canister 104. In some examples, canister vent valve 172 may be located along vent 136, coupled between the fuel vapor canister and the atmosphere, and may adjust a flow of air and vapors between canister 104 and the atmosphere. In one example, operation of canister vent valve 172 may be regulated by a canister vent solenoid (not shown). For example, based on whether the canister is to be purged or not, the canister vent valve may be opened or closed.

Furthermore, in some examples, one or more oxygen sensors 121 may be positioned in the engine intake 116, or coupled to the canister 104 (e.g., downstream of the canister), to provide an estimate of canister load. In still further examples, one or more temperature sensors 157 may be coupled to and/or within canister 104. For example, as fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister, and may be used to estimate canister load. In still other examples, output from exhaust gas oxygen sensor 125 may be relied upon for learning fuel vapor concentration stemming from the canister and/or estimating canister loading state.

Conduit 134 may optionally include a vapor bypass valve (VBV) 191. VBV 191 may include a notch opening or orifice (not shown), such that even when closed, the fuel tank may be allowed to vent pressure through said notch opening or orifice. A size of the notch opening or orifice may be calibratable. In one example, the notch opening or orifice may comprise a diameter of 0.09", for example. During regular engine operation, VBV 191 may be kept closed to limit the amount of diurnal or "running loss" vapors directed to canister 104 from fuel tank 128. During refueling operations, and selected purging conditions, VBV 191 may be temporarily opened (e.g. for a duration) to direct fuel vapors from the fuel tank 128 to canister 104. While the depicted example shows VBV 191 positioned along conduit 134, in alternate embodiments, the VBV may be mounted on fuel tank 128. The fuel tank 128 may hold a plurality of fuel blends, including fuel with a range of alcohol concentrations, such as various gasoline-ethanol blends, including E10, E85, gasoline, etc., and combinations thereof. Conduit 134 may in some examples also include a fuel tank pressure transducer (FTPT) 107.

Fuel vapor recovery system 154 may include a dual path purge system 171. Purge system 171 is coupled to canister 104 via a conduit 150. Conduit 150 may include a canister purge valve (CPV) 158 disposed therein. Specifically, CPV 158 may regulate the flow of vapors along duct 150. The quantity and rate of vapors released by CPV 158 may be determined by the duty cycle of an associated CPV solenoid (not shown). In one example, the duty cycle of the CPV solenoid may be determined by controller 166 responsive to engine operating conditions, including, for example, an air-fuel ratio. By commanding the CPV to be closed, the controller may seal the fuel vapor canister from the fuel vapor purging system, such that no vapors are purged via the fuel vapor purging system. In contrast, by commanding the CPV to be open, the controller may enable the fuel vapor purging system to purge vapors from the fuel vapor canister.

Fuel vapor canister 104 operates to store vaporized hydrocarbons (HCs) from fuel system 106. Under some operating conditions, such as during refueling, fuel vapors present in the fuel tank may be displaced when liquid is added to the tank. The displaced air and/or fuel vapors may be routed from the fuel tank 128 to the fuel vapor canister 104, and then to the atmosphere through vent 136. In this way, vaporized HCs may be stored in fuel vapor canister 104. During a later engine operation, the stored vapors may be released back into the incoming air charge via fuel vapor purging system 171 (also referred to herein as dual-path fuel vapor purging system, or dual-path purging system).

Conduit 150 is coupled to an ejector 140 in an ejector system 141 and includes a second check valve (CV2) 170 disposed therein. Second check valve (CV2) 170 may prevent intake air from flowing through from the ejector into conduit 150, while allowing flow of air and fuel vapors from conduit 150 into ejector 140. CV2 170 may be a vacuum-actuated check valve, for example, that opens responsive to vacuum derived from ejector 140.

A conduit 151 couples conduit 150 to intake 23 at a position within conduit 150 between check valve 170 and CPV 158 and at a position in intake 23 downstream of throttle 114. For example, conduit 151 may be used to direct fuel vapors from canister 104 to intake 23 using vacuum generated in intake manifold 116 during a purge event. Conduit 151 may include a first check valve (CV1) 153 disposed therein. First check valve (CV1) 153 may prevent intake air from flowing through from intake manifold 116 into conduit 150, while allowing flow of fluid and fuel vapors from conduit 150 into intake manifold 116 via conduit 151 during a canister purging event. CV1 may be a vacuum actuated check valve, for example, that opens responsive to vacuum derived from intake manifold 116.

Conduit 148 may be coupled to ejector 140 at a first port or inlet 142. Ejector 140 includes a second port 144 or inlet coupling ejector 140 to conduit 150. Ejector 140 is coupled to intake 23 at a position upstream of throttle 114 and downstream of compressor 126 via a conduit 148. During boost conditions, conduit 148 may direct compressed air in intake conduit 118 downstream of compressor 126 into ejector 140 via port 142.

Ejector 140 may also be coupled to intake conduit 118 at a position upstream of compressor 126 via a quick connect 214. As shown in FIG. 1, a conduit or hose 152 may couple the third port 146 or outlet of ejector 140 to intake conduit 118 via quick connect 214. While not explicitly illustrated, in some examples conduit 152 may include a shut-off valve (not shown), which may be commanded closed under certain vehicle operational conditions.

Ejector 140 includes a housing 168 coupled to ports 146, 144, and 142. In one example, only the three ports 146, 144, and 142 are included in ejector 140. Ejector 140 may include various check valves disposed therein. In some examples, ejector 140 may include a check valve positioned adjacent to each port in ejector 140 so that unidirectional flow of fluid or air is present at each port. For example, air from intake conduit 118 downstream of compressor 126 may be directed into ejector 140 via inlet port 142 and may flow through the ejector and exit the ejector at outlet port 146 before being directed into intake conduit 118 at a position upstream of compressor 126. This flow of air through the ejector may create a vacuum due to the Venturi effect at inlet port 144 so that vacuum is provided to conduit 150 via port 144 during boosted operating conditions. In particular, a low pressure region is created adjacent to inlet port 144 which may be used to draw purge vapors from the canister into ejector 140.

Ejector 140 includes a nozzle 133 comprising an orifice 135 which converges in a direction from port 142 toward suction inlet or port 144 so that when air flows through ejector 140 in a direction from port 142 towards port 146, a vacuum is created at port 144 due to the Venturi effect. This vacuum may be used to assist in fuel vapor purging during certain conditions, e.g., during boosted engine conditions. In one example, ejector 140 is a passive component. That is, ejector 140 is designed to provide vacuum to the fuel vapor purge system via conduit 150 to assist in purging under various conditions, without being actively controlled. Thus, whereas CPV 158 and throttle 114 may be controlled via controller 166, for example, ejector 140 may be neither controlled via controller 166 nor subject to any other active control. In another example, the ejector may be actively controlled with a variable geometry to adjust an amount of vacuum provided by the ejector to the fuel vapor recovery system via conduit 150.

During select engine and/or vehicle operating conditions, such as after an emission control device light-off temperature has been attained (e.g., a threshold temperature reached after warming up from ambient temperature) and with the engine running, the controller 166 may control CVV 172. For example, CVV 172 may be commanded open, except during evaporative emissions test diagnostics. At the same time, controller 166 may adjust the duty cycle of the CPV solenoid (not shown), thereby opening CPV 158. Pressures within fuel vapor purging system 171 may then draw fresh air through vent 136, fuel vapor canister 104, and CPV 158 such that fuel vapors flow into conduit 150.

The operation of ejector 140 within fuel vapor purging system 171 during vacuum conditions will now be described. The vacuum conditions may include intake manifold vacuum conditions. For example, intake manifold vacuum conditions may be present during an engine idle condition, with manifold pressure below atmospheric pressure by a threshold amount. This vacuum in the intake system 23 may draw fuel vapor from the canister through conduits 150 and 151 into intake manifold 116, as represented by dashed line(s) 103 and 103a.

Next, the operation of ejector 140 within fuel vapor purging system 171 during boost conditions will be described. The boost conditions may include conditions during which the compressor is in operation.

Fresh air enters intake passage 118 at air filter 174. During boost conditions, compressor 126 pressurizes the air in intake passage 118. Pressure in intake passage 118 upstream of compressor 126 is lower than intake manifold pressure during operation of compressor 126, and this pressure differential induces a flow of fluid from intake conduit 118 through duct 148 and into ejector 140 via ejector inlet 142. This fluid may include a mixture of air and fuel, in some examples. After the fluid flows into the ejector via the port 142, it flows through the converging orifice 135 in nozzle 133 in a direction from port 142 towards outlet 146. Because the diameter of the nozzle gradually decreases in a direction of this flow, a low pressure zone is created in a region of orifice 135 adjacent to suction inlet 144. The pressure in this low pressure zone may be lower than a pressure in duct 150. When present, this pressure differential provides a vacuum to conduit 150 to draw fuel vapor from canister 104, as indicated via dashed line(s) 105. This pressure differential may further induce flow of fuel vapors from the fuel vapor canister, through the CPV, and into port 144 of ejector 140. Upon entering the ejector, the fuel vapors may be drawn along with the fluid from the intake manifold out of the ejector via outlet port 146 and into intake 118 at a position upstream of compressor 126, as indicated via dashed lines 105a and 105b. Operation of compressor 126 then draws the fluid and fuel vapors from ejector 140 into intake passage 118 and through the compressor. After being compressed by compressor 126, the fluid and fuel vapors flow through charge air cooler 156, for delivery to intake manifold 116 via throttle 114.

Vehicle system 100 may further include a control system 160. Control system 160 is shown receiving information from a plurality of sensors 162 (various examples of which are described herein) and sending control signals to a plurality of actuators 164 (various examples of which are described herein). As one example, sensors 162 may include an exhaust gas sensor 125 (located in exhaust manifold 120) and various temperature and/or pressure sensors arranged in intake system 23. For example, a pressure or airflow sensor 115 (also referred to as manifold air pressure sensor or MAP sensor) in intake conduit 118 downstream of throttle 114, a pressure or air flow sensor 117 in intake conduit 118 between compressor 126 and throttle 114, and a pressure or air flow sensor 119 in intake conduit 118 upstream of compressor 126. It may be understood that pressure sensor 117 may be used to infer a throttle inlet pressure (TIP). It may be further understood that pressure sensor 115 may be used to infer an intake manifold pressure. In some examples, pressure sensor 119 may comprise a dedicated barometric pressure sensor. Other sensors such as additional pressure, temperature, air/fuel ratio, and composition sensors may be coupled to various locations in the vehicle system 100. As another example, actuators 164 may include fuel injectors 132, throttle 114, compressor 126, a fuel pump of pump system 130, etc. The control system 160 may include an electronic controller 166. The controller may receive input data from the various sensors, process the input data, and trigger the actuators in response to the processed input data based on instruction or code programmed therein corresponding to one or more routines.

In some examples, the vehicle system 100 may be configured as a hybrid electric vehicle (HEV) or plug-in HEV (PHEV), with multiple sources of torque available to one or more vehicle wheels 198. In the example shown, vehicle system 100 may include an electric machine 195. Electric machine 195 may be a motor or a motor/generator. Crankshaft 199 of engine 112 and electric machine 195 are connected via a transmission 197 to vehicle wheels 198 when one or more clutches 194 are engaged. A crankshaft position sensor 138 may be included, in some examples. In the depicted example, a first clutch is provided between crankshaft 199 and electric machine 195, and a second clutch is provided between electric machine 195 and transmission 197. Controller 166 may send a signal to an actuator of each clutch 194 to engage or disengage the clutch, so as to connect or disconnect crankshaft 199 from electric machine 195 and the components connected thereto, and/or connect or disconnect electric machine 195 from transmission 197 and the components connected thereto. Transmission 197 may be a gearbox, a planetary gear system, or another type of transmission. The powertrain may be configured in various manners including as a parallel, a series, or a series-parallel hybrid vehicle.

Electric machine 195 receives electrical power from a traction battery 196 to provide torque to vehicle wheels 198. Electric machine 195 may also be operated as a generator to provide electrical power to charge traction battery 196, for example during a braking operation.

As discussed above, quick connect 214 may couple conduit 152 to intake passage 118. However, there may be other locations where quick connects may be utilized in similar fashion. For example, intake passage 118 may be coupled to conduit 148 via another quick connect, represented by first dashed circle 161. As another example, intake manifold 116 may be coupled to conduit 151 via another quick connect, represented by second dashed circle 163. As another example, fuel tank 128 may be coupled to conduit 134 via another quick connect, represented by third dashed circle 165. While not specifically shown at FIG. 1, there may be still further examples where quick connects may be used for assembly of the evaporative emissions system. For example, fuel vapor canister 104 may be coupled to one or more of purge line 150, vent line 136 and/or conduit 134 via quick connects.

As discussed above, it can be challenging to ascertain whether one or more quick connects included in a vehicle evaporative emissions system are effectively secured. Discussed herein are systems and methods to enable an accurate determination as to whether particular quick connections are properly secured or not. The systems and methods rely on color changing material included as part of quick connect(s), as will be elaborated in further detail below. As an example, the color changing material may comprise materials that change color via deformation (e.g. stretching, twisting, contracting, compressing, etc.). The color changes may be due to space between nanoparticles changing as a result of the deformation, thereby altering a wavelength at which the material reflects light. For example, stretching may cause a green material to become blue, and the blue material may become green when compressed. Such an example is meant to be illustrative, and other color changes are within the scope of this disclosure. Such color changes may be temporary, or in other words, such color changes may be reversible. As an example, the color changing material may comprise synthetic polymer opals.

Turning now to FIG. 2, an example illustration 200 is shown depicting broadly how use of such color changing material may enable determination as to whether a quick connection is properly secured or not. Example illustration 200 is divided into illustration 201 and illustration 250. Beginning with illustration 201, depicted is a male quick connector 205 and a female quick connector 210. Female quick connector includes color changing material 212, which represents a subsection of female quick connector 210. The subsection that includes the color changing material may be referred to herein as an indicator section. To further distinguish color changing material 212, color changing material 212 is represented as a dashed line at FIG. 2.

Female quick connector 210 is depicted as being coupled to conduit 215. Conduit 215 is attached to an attachment point 217. Attachment point may be a particular attachment site associated with a vehicle evaporative emissions system or fuel system, for example. In some examples, attachment point 217 may comprise a hard mounted attachment of conduit 215 to an attachment site. For example, conduit 215 may be attached at attachment point 217 via one of spin welding, laser bonding, adhesive, etc. However, any other means of attachment are within the scope of this disclosure. In some examples conduit 215 may be attached at attachment point 217 via a quick connect.

At illustration 201, it may be understood that an entirety of female quick connector 210 and conduit 215 is not under tension. When not under tension, conduit 215 and female quick connector 210 are of a length 220 that is not long enough to effectively secure female quick connector 210 to male quick connector 205, as evidenced by the fact that female quick connector 210 does not extend over or reach male bead port 218. When not under tension, color changing material 212 adopts a first length 221. While not explicitly illustrated, it may be understood that when color changing material 212 adopts the first length 221, color changing material 212 is of a first color.

Turning now to illustration 250, it depicts a situation where tension has been applied to the entirety of female quick connector 210 and conduit 215, by pulling on female quick connector 210 in the direction of arrow 255. It may be understood that such pulling may be accomplished via a human or in other examples via a machine used for automated assembly purposes. Specifically, it may be understood that tension is applied in the direction of arrow 255 by pulling female connector 210 against the fixed attachment point 217.

It may be understood that tension is applied to the female quick connector 210 and conduit 215 in the direction of arrow 255 in order to attach female quick connector 210 to male quick connector 205. The act of applying tension in the direction of arrow 255 results in an elongation of color changing material 212, such that the entirety of female quick connector 210 and conduit 215 are of length 251. Under such tension, color changing material 212 adopts second length 252 (while other aspects of female quick connector 210 and conduit 215 do not change length). While not explicitly illustrated, it may be understood that when color changing material 212 adopts the second length 252, color changing material 212 is of a second color.

Thus, illustration 250 depicts a situation where female quick connector 210 is effectively secured to male quick connector 205, as evidenced by female quick connector 210 extending past male bead port 218. It may be understood that in some examples, a redundant latch (not shown) may be used to secure male quick connector 205 to female quick connector 210, at a point where female quick connector 210 extends beyond male bead port 218. However, in other examples, such a redundant latch may not be included, and the female quick connector may be effectively secured to the male quick connector once the female quick connector extends past the male bead port. For the present disclosure, how the female quick connector becomes secured to the male quick connector may be accomplished in various manners as is known in the art, but it may be understood that the color of the color changing material is of the first color when the female quick connector is not effectively secured to the male quick connector, and is of the second color when the female quick connector is effectively secured to the male quick connector. It may be understood that, for the present disclosure, effectively or properly sealing or connecting the male and female quick connector may include formation of a seal for which fluid (e.g. gas or liquid) cannot pass or leak through. Effectively or properly sealing or connecting the male and female quick connectors may further include the connected female and male quick connectors being unable to be physically separated by simple pulling of the male and female quick connector fittings in opposite directions, vibrations due to vehicle operation, etc.

Based on the description above with regard to FIG. 2, it may be understood that the portion of female quick connector 210 corresponding to color changing material 212 is the portion that changes in length, while other aspects of female quick connector 210 and conduit 215 do not change in length to an appreciable extent. Accordingly, based solely on the color change of the color changing material 212, it may be ascertained as to whether the female quick connector 210 is effectively secured to the male quick connector 205. Specifically, when color changing material 212 is of the first color the female quick connector 210 is not effectively secured to the male quick connector 205, whereas when color changing material 212 is of the second color the female quick connector 210 is effectively secured to the male quick connector 205.

Determination of the color of color changing material 212 in order to ascertain whether female quick connector 210 is effectively secured to male quick connector 205 may in some examples be done by a human being via visual inspection. Additionally or alternatively, such determination as to color change may be accomplished via a camera-based vision system (e.g. color vision system), as will be elaborated in further detail below.

It may be understood that color changing material 212 may change color gradually from the first color to the second color as the color changing material 212 elongates or stretches. Thus, it may be understood that color changing material 212 may be designed in accordance with female connector 210 and conduit 215 such that color changing material 212 changes length by an amount sufficient to completely change color from the first color to the second color when securing female connector 210 to male connector 205.

While the description above corresponds to use of a single color changing material (e.g. 212) included in female quick connector 210 in order to ascertain whether female quick connector 210 is effectively secured to male quick connector 205, it is herein recognized that it may in some examples be desirable to rely on more than one color change for determining that the female connector of a quick connector system is effectively secured to a male connector. FIGS. 3A-3C discussed below relate to such examples.

Turning now to FIG. 3A, example illustration 300 is depicted as three parts (e.g. part I, part II, and part III). Beginning at part I, illustration 300 depicts a female quick connector 302, and a male quick connector 303. Female quick connector 302 includes first color changing material 304, which adopts a first length 305 and thus a first color 309 when tension is not applied to female quick connector 302, similar to that discussed above with regard to FIG. 2. In other words, while not explicitly illustrated at FIG. 3A, it may be understood that female quick connector 302 may be attached to a conduit (not shown) that is secured to an attachment point (not shown) at an end opposite to female quick connector 302 such that in order to effectively secure female quick connector 302 to male quick connector 303, tension may be applied to female quick connector in the direction of arrow 306.

Further depicted at part I, illustration 300 depicts female connector 302 as including a second color changing material 307. Second color changing material 307 may comprise a flexible material that is designed to adopt a curved or concave shape when not pressed down or flattened by an external force. In other words, second color changing material 307 may be concave inwards in a direction of a cavity 308 of female quick connector 302 in an absence of external force. In the absence of such an external force, second color changing material 307 may have a second color (or second color patterning) 310 that is a function of the degree of concavity of the second color changing material 307. Color patterning is discussed with regard to second color changing material 307 because of the concave nature of second color changing material with potentially different areas of tension/contraction/etc. Second color changing material 307 may extend around a circumference of female quick connector 302 in some examples, or may not extend around the circumference of female quick connector 302 in other examples.

Male quick connector 303 may include a concave structure 311 that is designed to receive the second color changing material 307, as will be discussed in further detail below. Adjacent to the concave structure 311 of male quick connector 303 may be a non-concave section 312 which may function to press down or flatten the second color changing material 307 when tension is applied to female quick connector 302 in the direction of arrow 306. In other words, when female quick connector 302 is connected to male quick connector 303 via movement of female quick connector 302 in the direction of arrow 306.

Moving to part II of illustration 300, it depicts a situation where tension is being applied to female quick connector 302 in the direction of arrow 306. Accordingly, a portion of male quick connector 303 is inserted into cavity 308 of female quick connector 302. The portion of male connector inserted into cavity 308 is depicted as dashed lines. As shown at part II of illustration 300, the non-concave section 312 of male quick connector 303 causes second color changing material 307 to flatten, and as such second color changing material 307 adopts a third color 315. Furthermore, the application of tension to female quick connector in the direction of arrow 306 causes first color changing material 304 to adopt a second length 316. Accordingly, at part II, first color changing material 304 is a fourth color 317. It may be understood that part II depicts a situation where female quick connector 302 is not effectively secured to male quick connector 303.

Proceeding to part III of illustration 300, it depicts a situation where further tension has been applied to female quick connector 302 in the direction of arrow 306, such that concave structure 311 of male quick connector 303 receives color changing material 307. In other words, the concave structure 311 of male quick connector 303 is such that external force from the non-concave section 312 of male quick connector 303 is no longer pressing on color changing material 307, resulting in color changing material 307 returning to its original structure (refer to part I of illustration 300). Accordingly, color changing material 307 once again is of the second color (or second color patterning) 310. Furthermore, the additional tension applied to female quick connector 302 in the direction of arrow 306 further elongates first color changing material 304 to third length 320, resulting in first color changing material 304 being a fifth color 321. It may be understood that part III depicts a situation where female quick connector 302 is effectively secured to male quick connector 303. Thus, in such an example, it may be determined that female quick connector 302 is effectively secured to male quick connector 303 when first color changing material 304 is of the fifth color 321 and where second color changing material is of the second color (or second color patterning) 310. In some examples, the fifth color 321 and the second color 310 may comprise a same color. However, in other examples the fifth color 321 and the second color 310 may comprise different colors.

Turning now to FIG. 3B, another example illustration 325 is depicted showing a different mechanism whereby effective securement of a female quick connector to a male quick connector may be determined by a two-color scheme similar to that discussed above at FIG. 3A. Example illustration 325 is broken up into three parts, part IV, part V, and part VI. Turning to part IV of illustration 325, depicted is female quick connector 326, and male quick connector 327. Female quick connector 326 includes a first color changing material 328, which adopts a first length 329 and thus a first color 330 when tension is not applied to female quick connector 326, similar to that discussed above with regard to FIG. 2. In other words, while not explicitly illustrated at FIG. 3B, it may be understood that female quick connector 302 may be attached to a conduit (not shown) that is secured to an attachment point (not shown) at an end opposite to female quick connector 326 such that in order to effectively secure female quick connector 326 to male quick connector 327, tension may be applied to female quick connector 326 in the direction of arrow 331.

Female quick connector 326 further includes second color changing material 332. As depicted, second color changing material 332 is held in an elongated position via a spring-based mechanism 333. When second color changing material 332 is biased to the elongated position as depicted at part IV of illustration 325, second color changing material 332 adopts a second length 334, and thus a second color 335.

Proceeding to part V of illustration 325, tension is being applied to female quick connector 326 in the direction of arrow 331, such that male quick connector 327 is partially inserted into cavity 336 of female quick connector 326. The portion of male quick connector 327 that is inserted into cavity 336 of female quick connector 326 is depicted as dashed lines. As illustrated at part V, insertion of male quick connector 327 into cavity 336 of female quick connector 326 causes male quick connector 327 to press against spring-based mechanism 333, resulting in a compression of the spring-based mechanism which in turn causes second color changing material 332 to adopt a curved shape. The curved nature of second color changing material 332 results in second color changing material 332 adopting a third color (or third color patterning) 337.

Furthermore, application of tension to female quick connector 326 in the direction of arrow 331 results in first color changing material 328 adopting a second length 338, and thus a fourth color 339. It may be understood that part V of illustration 325 depicts a situation where female quick connector 326 is not effectively secured to male quick connector 327. In other words, it may be determined that female quick connector 326 is not effectively secured to male quick connector 327 under conditions where first color changing material 328 is of the fourth color 339 and where second color changing material 332 is of the third color (or third color patterning) 327.

Proceeding to part VI of illustration 325, additional tension is applied to female quick connector 326 in the direction of arrow 331 such that male quick connector 327 extends further into cavity 336 of female quick connector 326. Accordingly, male quick connector 327 further compresses spring-based mechanism 333, resulting in a further deformation or curving of second color changing material 332. As a result of the further deformation or curving, second color changing material 332 adopts a fifth color or fifth color pattern 340.

Furthermore, application of tension to female quick connector 326 in the direction of arrow 331 results in first color changing material 328 adopting a third length 341, and thus a sixth color 342. It may be understood that part VI of illustration 325 depicts a situation where female quick connector 326 is effectively secured to male quick connector 327. In other words, it may be determined that female quick connector 326 is effectively secured to male quick connector 327 under conditions where first color changing material 328 is of the sixth color 342 and where second color changing material 332 is of the fifth color or fifth color pattern 340.

Turning now to FIG. 3C, another illustration 350 of an example quick connect mechanism is shown. Example illustration 350 is broken up into three parts, part VII, part VIII, and part IX. Beginning at part VII, it depicts female quick connector 351, and male quick connector 352. Female quick connector 351 comprises a flexible portion 353 for receiving male quick connector 352. Flexible portion 353 includes one or more attachment teeth 354, for insertion into one or more receiving grooves 355 associated with male quick connector 352. Female quick connector 351 includes first color changing material 356, which adopts a first length 357 and thus a first color when tension is not applied to female quick connector 351, similar to that discussed above with regard to FIG. 2. In other words, while not explicitly illustrated at FIG. 3C, it may be understood that female quick connector 351 may be attached to a conduit (not shown) that is secured to an attachment point (not shown) at an end opposite to female quick connector 351 such that in order to effectively secure female quick connector 351 to male quick connector 352, tension may be applied to female quick connector 351 in the direction of arrow 358.

Additionally, flexible portion 353 may include color changing material that changes color upon deformation. In one example, all of flexible portion 353 includes the color changing material, whereas in other examples only a desired fraction of flexible portion 353 includes the color changing material. In this example illustration, a fraction of flexible portion 353 includes color changing material 359. The fraction of flexible portion 353 that includes color changing material 359 is depicted as the fraction defined by line 360.

The dashed lines (not numbered) depicted at FIG. 3C define three different sections of flexible portion 353 which may have distinct color due to the degree of deformation of the color changing material 359 associated with the different sections. The three different sections defined by the dashed lines include first section 361, second section 362, and third section 363. When flexible portion 353 does not extend over any portion of male quick connector 352 such as that depicted at part VII of FIG. 3C, first section 361 may be of a second color, second section 362 may be of a third color, and third section 363 may be of a fourth color. Thus, in an example where first color changing material 356 is the first color, and where first section 361 is of the second color, second section 362 is of the third color and third section 363 is of the fourth color, it may be determined that female quick connector 351 is disconnected completely from male quick connector 352 as depicted at part VII.

Proceeding to part VIII, depicted is a condition where tension is applied to female quick connector 351 in the direction of arrow 358. Flexible portion 353 of female quick connector 351 extends over a portion of male quick connector 352, but the attachment teeth 354 are not inserted into receiving grooves 355. In such an example, first color changing material 356 adopts a second length 370, and accordingly, a fifth color 371. Furthermore, the extending of the flexible portion 353 of female quick connector 351 over the portion of male quick connector 352 results in deformation of the flexible portion 353 of female quick connector 351 to different degrees corresponding to the first section 361, second section 362 and third section 363. Accordingly, first section 361 is of a sixth color, second section 362 is of a seventh color, and third section 363 is of an eighth color. Thus, in a situation where first color changing material is of the fifth color, and where the first section 361 is of the sixth color, second section 362 is of the seventh color, and third section 363 is of the eighth color, it may be determined that female quick connector 351 is at least partially engaged with male quick connector 352. However, in such an example it may be determined that female quick connector 351 is not effectively secured to male quick connector 352.

Proceeding to part IX, depicted is a condition where tension has been applied to female quick connector 351 in the direction of arrow 358 to a point where attachment teeth 354 engage receiving grooves 355 of male quick connector 352. In such an example, first color changing material 356 adopts a third length 375, and accordingly, a ninth color 376. Furthermore, with attachment teeth 354 engaged with receiving grooves 355 of male quick connector 352, the flexible portion 353 of female quick connector 351 returns to a similar conformation as that adopted prior to the flexible portion 353 being extended over male quick connector 352. Accordingly, first section 361 again is of the second color, second section 362 again is of the third color, and third section 363 is again of the fourth color. It may be understood that part IX of illustration 350 depicts a situation where female quick connector 351 is effectively secured to male quick connector 352. Thus, it may be determined that female quick connector 351 is effectively secured to male quick connector 352 under circumstances where first color changing material 356 is ninth color 376, and where first section 361 is of the second color, second section 362 is of the third color, and third section 363 is of the fourth color.

While the above discussion with regard to FIG. 3C centered on an example where the flexible portion 353 of female quick connector 351 returned to its original shape when effectively engaged or secured to male quick connector 352, in other examples the flexible portion may not return to its original shape, but rather may adopt a somewhat different shape. Thus, in such an example first section 361 may comprise a tenth color, second section 362 may comprise an eleventh color, and third section 363 may comprise a twelfth color. Accordingly, in such an example it may be determined that female quick connector 351 is effectively secured to male quick connector 352 when first color changing material 356 is ninth color 376, and where first section 361 is the tenth color, second section 362 is the eleventh color, and third section 363 is the twelfth color. Furthermore, similar to the flexible portion 353 of FIG. 3C depicted as being separated into distinct sections (e.g. first section 361, second section 362 and third section 363), so too may the second color changing material 307 depicted at FIG. 3A and/or second color changing material 332, although not specifically illustrated.

The examples discussed above with regard to FIGS. 3A-3C include one color changing material (e.g. first color changing material 304 at FIG. 3A) that responds to tension applied to the female quick connector, and another color changing material (e.g. second color changing material 307 at FIG. 3A) that is deformed due to some sort of physical interaction of the portion of the female quick connector that includes the color changing material with the male quick connector (e.g. 303 at FIG. 3A). By including two color changing materials, confidence may be increased as to whether a particular female quick connector is effectively secured to a male quick connector, as compared to reliance on a single color changing material. However, it is within the scope of this disclosure to rely on one color changing material such as discussed above at FIG. 2 where the color change material was discussed to respond to changes in tension applied to the female quick connector. Other examples may include the reliance on one color changing material that responds to some physical interaction with the male quick connector, without inclusion of the color changing material that is tension-based. It is herein recognized that it may be desirable to utilize such a color changing material that responds to interaction with the male quick connector as discussed with regard to FIGS. 3A-3C in situations where it is not desirable to include the tension-based color changing material.

As discussed, the use of such color changing materials as indicators included in quick connectors may enable visual inspection by a human technician to ascertain whether a particular quick connector is properly or effectively secured. Additionally or alternatively, a machine-based color vision system that is capable of differentiating colors may be used to verify whether particular quick connects are effectively secured based on an expected color or expected color schemes, depending on how the particular quick connects are configured with color changing materials as discussed above with regard to FIGS. 2-3C. Furthermore, as discussed above with regard to FIGS. 2-3C, the process of connecting a female quick connector to a male quick connector may result in dynamic color changes as a color changing material proceeds along a spectrum from one color to another color. This process of dynamic color change may in some examples be utilized to infer correct connection procedures in terms of securing female quick connectors to male quick connectors. For example, the color vision system may be used during the process of connection of female quick connectors to male quick connectors. Such a color vision system may be utilized in one example while a technician is assembling the quick connection. In other examples, such a color vision system may be utilized while a machine is auto-assembling the quick connection. There may be particular advantages to relying on a color vision system to inspect proper securement of quick connectors, as opposed to other vision systems that do not rely on color schemes. For example, a vision system that is not color-based may zoom in on a particular connection in an attempt to measure a depth of insertion of a male quick connector into a female quick connector. However, such depth measurements may be prone to error as for such a process to work the particular vehicle system (e.g. evaporative emissions system) may have to have a precise alignment every time. If the particular vehicle system is misaligned, the depth measurement may be faulty. Other examples such as reliance on whether a redundant latch is properly engaged may face similar challenges. Such issues may be largely avoided by relying on color changes corresponding to proper quick connect securement, which may be less impacted by small changes in vehicle system alignment for the process of visual inspection.

Turning now to FIG. 4, an example color vision system 400 is shown that may be used for inferring whether particular quick connectors that include color changing materials as discussed above with regard to FIGS. 2-3C are properly secured. As an example, the particular quick connectors may be quick connectors used in a vehicle evaporative emissions system, such as that depicted at FIG. 1. However, it is within the scope of this disclosure to use such a color vision system to similarly determine proper securement of quick connectors associated with other aspects of vehicle systems (e.g. A/C lines, brake lines, etc.).

Broadly speaking, color vision system 400 includes computing system 405, one or more cameras 406 which may be used for acquiring images and/or video, one or more lights 407 for illumination purposes, and input/output ports 408. Computing system 405 may control position of the one or more cameras 406 via a camera positioning system 480, which may include one or more camera positional actuators (not shown) and one or more camera positional sensors (not shown). Computing system 405 may additionally or alternatively control position of the one or more lights 407 via light positioning system 481, which may include one or more light positional actuators (not shown) and one or more light positional sensors (not shown). Computing system 405 may be communicatively coupled to network 431 via wired or wireless communication. In some examples, computing system 405 may be communicatively coupled to cloud-based server 432 via network 431, for data storage. Computing system 405 may include a number of subsystems including but not limited to logic subsystem 421, data-holding subsystem 422, display subsystem 423, and communication subsystem 424. Each of the subsystems will be briefly discussed below.

Logic subsystem 421 may include one or more physical devices configured to execute one or more instructions. Broadly speaking, discussed herein logic subsystem 421 may be referred to as a controller. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processor(s) of the logic subsystem may be single or multi-core, and the programs executed thereon may be configured for parallel or distributed processing. The logic subsystem may optionally include one or more engines for processing and analyzing data. It may be understood that the instructions executed by logic subsystem may pertain to color analysis algorithms to determine particular colors associated with quick connectors, so as to determine whether particular quick connectors are properly or improperly secured.

Data-holding subsystem 422 may each include one or more physical, non-transitory devices configured to hold data and/or instructions executable by the logic subsystem to implement parts of the herein described methods and processes. When such methods and processes are implemented, the state of the data-holding subsystems may be transformed (for example, to hold different data).

The data-holding subsystem may include removable media and/or built-in devices. Additionally or alternatively, the data-holding subsystems may include optical memory (for example, CD, DVD, HD-DVD, Blu-Ray Disc, etc.), and/or magnetic memory devices (for example, hard drive disk, floppy disk drive, tape drive, MRAM, etc.), and the like. Additionally or alternatively, the data-holding subsystem may include devices with one or more of the following characteristics: volatile, nonvolatile, dynamic, static, read/write, read-only, random access, sequential access, location addressable, file addressable, and content addressable.

Display subsystem 423 may be used to present a visual representation of data held by the data-holding subsystem 422. As the herein described methods and processes may change the data held by the data-holding subsystems and may thus transform the state of the data-holding subsystems, the state of the display subsystems may likewise be transformed to visually represent changes in the underlying data. Each of the display subsystems may include one or more display devices utilizing virtually any type of technology.

The communication subsystem 424 may include wired and/or wireless communication devices compatible with one or more different communication protocols. As non-limiting examples, the communication subsystem may be configured for communication via a wireless telephone network, a wireless local area network, a wired local area network, a wireless wide area network, a wired wide area network, etc. In some examples, the communication subsystem may allow computing device 405 to send and/or receive messages, data and other information from other devices and systems via network 431. In some examples, network 431 may be the public Internet.

For illustrative purposes, depicted at FIG. 4 are two different quick connectors, first quick connector 450 and second quick connector 451. First quick connector 450 includes first female quick connector 452 and first male quick connector 453. First male quick connector includes first male port bead 454. First female quick connector 452 includes first color changing material 455. As depicted, first color changing material 455 is of a first length 456. When first color changing material 455 adopts the first length, it may be understood that first color changing material is a first color 457. While not explicitly illustrated, in this example illustration it may be understood that first color 457 is yellow. When first color changing material 455 is indicated to be yellow by the color vision system 400, it is determined that the first quick connector 450 is not properly secured or connected, as evidenced by the fact that first female quick connector 452 does not extend over first male port bead 454.

Turning to second quick connector 451, it includes second female quick connector 460 and second male quick connector 461. Second female quick connector 460 includes second color changing material 462. As depicted, second color changing material is of a second length 463. When second color changing material 462 is of the second length 463, it may be understood that second color changing material is a second color 464. While not explicitly illustrated, in this example illustration it may be understood that second color 464 is green. When second color changing material 462 is indicated to be green by the color vision system 400, it is determined that the second quick connector 451 is properly connected, as evidenced by the fact that second female quick connector 460 extends past a second male port bead (not able to be seen due to the proper securement). It may be understood that second color changing material 462 adopts the second color 464 (and second length 463) when second female quick connector 460 is under tension due to being properly secured to second male quick connector 461. Alternatively, because first female connector 452 is not properly connected to first male connector 453, a lack or absence of tension on first female connector 452 results in first color changing material 455 adopting the first color 457 (green), and first length 456.

For illustrative purposes, color vision system 400 was discussed above with regard to indicating whether quick connects are properly secured based on a tension-actuated color change, similar to that discussed above at FIG. 2. However, it may be understood that color vision system 400 may be similarly utilized to ascertain proper quick connect securement for quick connects with color indicating schemes such as those depicted at FIGS. 3A-3C and discussed herein, without departing from the scope of this disclosure. It may be understood that color vision system 400 may be utilized in some examples during assembly (manual assembly or machine-based assembly) of quick connects, to infer when quick connects have been properly secured. In one such an example, color vision system 400 may be capable of monitoring dynamic color changes in one or more color changing materials associated with a particular quick connector as the quick connector is being connected as a means of inferring that the connection has been properly established. In such an example, deviations in dynamic expected color changes may be indicative of potential degradation or incorrect coupling, whereas expected color change dynamics (e.g. correct procession of color change from an initial color, to an intermediate color, then to a final color) may be indicative of proper quick connect assembly. In order to monitor dynamic color changes, in one example a plurality of images may be acquired over time as a particular quick connector is undergoing assembly. For example, images may be acquired at predefined intervals while the particular quick connector is being assembled. The plurality of all images acquired while the particular quick connector is being assembled may be analyzed via computing system 405 so as to determine color change dynamics during quick connector assembly in order to infer whether the particular quick connector is effectively or properly secured. In other examples, camera(s) 406 may record video of the process of quick connector assembly, and computing system 405 may analyze the video for dynamic color changes by partitioning the video into any number of frames for color change analysis.

Additionally or alternatively, color vision system 400 may be used as a means of checking a plurality of quick connects previously assembled along an assembly line and/or as a means of determining which quick connects are not properly secured during a vehicle service procedure (e.g. after the vehicle has been driven on the road for some time). In such examples, instead of acquiring a plurality of images in order to assess dynamic color changes, color vision system may simply acquire an image of a particular quick connector. In some examples such a quick connector may include one color changing material (e.g. see FIG. 2), whereas in other examples such a quick connector may include more than one color changing material (refer to FIGS. 3A-3C). In an example where such a quick connector includes one color changing material, the image may be processed via computing system 405 to ascertain whether the color changing material is of a color that corresponds to the quick connector being properly connected, or alternatively is of a color that corresponds to the quick connector being improperly connected or disconnected. In an example where such a quick connector includes more than one color changing material (e.g. two color changing materials such as that depicted at FIGS. 3A-3C), the image may be processed via computing system 405 to ascertain whether the quick connector plurality of colors corresponds to the quick connector being properly assembled. As an example, proper connection of a particular quick connector may be inferred when a first color changing material is a first color and a second color changing material is of a second color. Such an example is meant to be illustrative.

Turning now to FIG. 5 depicted is an example illustration 500 of how a color changing material that changes color in response to tension may be incorporated into a female quick connector. Example illustration 500 is divided into a first example illustration 502 where tension is not applied to the female quick connector, and a second example illustration 504 where tension is applied to the female quick connector.

Beginning at example illustration 502, female quick connector 505 includes color changing material 508. Inset 510 shows a close-up of the section of female quick connector 505 corresponding to color changing material 508. Dashed lines depict color changing material 508. As depicted, color changing material 508 wraps around a flexible inner portion 509 of female quick connector 505. Color changing material 508 may be adhered in any manner known in the art to flexible inner portion 509. For example, color changing material 508 may be adhered to flexible inner portion 509 via one or more of glue (e.g. super glue, hot glue, etc.), pressure sensitive adhesive, spray adhesive, epoxy, plyurethane, etc. The flexible nature of flexible inner portion 509 may enable flexible inner portion 509 to elongate in response to tension being applied to female quick connector 505. As flexible inner portion 509 elongates, so too may color changing material 508. Elongation of color changing material 508 may result in a color change of color changing material 508. Without tension being applied to female quick connector 505, color changing material 508 and flexible inner portion 509 correspond to a first length 512, and as a result, color changing material 508 is first color 513.

Turning now to second example illustration 504, it depicts female quick connector 505 where tension is applied in the direction of arrow 515. As tension is applied in the direction of arrow 515, flexible inner portion 509 elongates to second length 516. As flexible inner portion 509 elongates to second length 516, so too does color changing material 508. With color changing material 508 at the second length 516, color changing material 508 is second color 520.

Thus, discussed herein a color vision system is disclosed for determining whether a first quick connector fitting is properly secured to a second quick connector fitting. The color vision system may comprise one or more color cameras. The color vision system may include a computing system, the computing system storing instructions for acquiring a set of color images of the first quick connector fitting via the one or more color cameras during a process whereby the first quick connector fitting is connected to the second quick connector fitting. The instructions may further include processing the set of color images in order to determine an actual dynamic color change over time that occurs while the first quick connector fitting is connected to the second quick connector fitting. The instructions may further include comparing the actual dynamic color change to an expected dynamic color change. The instructions may further include, in response to the actual dynamic color change correlating with the expected dynamic color change based on comparing the actual dynamic color change to the expected dynamic color change, providing an indication that the first quick connector fitting is properly secured to the second quick connector fitting. The instructions may further include, in response to the actual dynamic color change differing from the expected dynamic color change based on comparing the actual dynamic color change to the expected dynamic color change, providing a request to reconnect the first quick connector fitting to the second quick connector fitting.

For such a color vision system, processing the set of color images to determine the actual dynamic color change and comparing the actual dynamic color change to the expected dynamic color change may occur while the first quick connector fitting is being connected to the second quick connector fitting. Furthermore, the request to reconnect the first quick connector fitting may occur at any time while the first quick connector fitting is being connected to the second quick connector fitting.

Such a color vision system may further comprise a display subsystem. In such an example, the computing system may store further instructions to provide the indication that the first quick connector fitting is properly secured to the second quick connector fitting or to provide the request to reconnect the first quick connector fitting to the second quick connector fitting via the display subsystem. Additionally or alternatively, such a color vision may include a communication subsystem. In such an example the computing system may store further instructions to provide the indication that the first quick connector fitting is properly secured to the second quick connector fitting or to provide the request to reconnect the first quick connector fitting to the second quick connector fitting via the communication system. For example, the indication or the request may be provided to a control system of a machine that is operable for connecting the first quick connector fitting and the second quick connector fitting. In other examples, the indication or request may be provided to a remote computing system, such as a laptop, tablet, smartphone, etc., viewable via a technician.

Turning now to FIG. 6, an example method 600 is shown for determining whether one or more quick connections that are included in a vehicle evaporative emissions system (for example), are properly secured. Specifically, a quick connection that is properly secured may include a female quick connector being secured to a male quick connector in a manner whereby the female quick connector cannot readily disengage from the male quick connector. Said another way, a quick connection that is properly secured may include the female quick connector being engaged with the male quick connection in a manner that forms a seal that does not allow for fluid (e.g. gas or liquid) to escape from the seal. Determination as to whether the one or more quick connections are properly secured as discussed with regard to method 600 may include relying on a color vision system (e.g. color vision system 400 at FIG. 4) to assess a color or color combination corresponding to one or more color changing materials associated with the quick connector, to infer proper or improper connection.

Accordingly, method 600 will be described with reference to the systems and components described herein and shown in FIGS. 1-5, though it will be appreciated that similar methods may be applied to other systems and components without departing from the scope of this disclosure. Instructions for carrying out method 600 and the rest of the methods included herein may be executed by a computing system, such as computing system 405 of FIG. 4, based on instructions stored in non-transitory memory (e.g. instructions stored at the controller, or logic subsystem), and at least in part in conjunction with information retrieved from one or more of camera(s) (e.g. cameras 406 at FIG. 4), camera positional system (e.g. camera positional system 480 at FIG. 4), light positional system (e.g. light positional system 481 at FIG. 4), etc.

It may be understood that example method 600 may broadly pertain to use of the color vision system to ascertain proper or improper quick connection securement after assembly as part of an "end of line" procedure, or during particular portions of the vehicle assembly process. Method 600 may additionally or alternatively pertain to use of the color vision system to ascertain proper or improper quick connection securement during a vehicle service procedure, for example after the vehicle has been driven on the road for some amount of time.

Accordingly, method 600 begins at 605 and includes acquiring a color image of a quick connector. Specifically, the controller may command the camera to acquire a color image corresponding to the quick connector. With the color image acquired, method 600 proceeds to 610, where the acquired image is processed via instructions stored at the computing system, so as to ascertain a color or color combination corresponding to the quick connector. Determination of a color or color combination may be accomplished by any one of computer vision color detection methodologies known in the art. For example, in a case where the quick connector includes a single color due to a presence of a single color changing material similar to that depicted at FIG. 2, then processing the acquired image at 610 may include the computing system inferring the color corresponding to the single color changing material. However, as discussed with regard to FIGS. 3A-3C, in some examples two (or more) distinct aspects or areas of a quick connector may include color changing material. In such an example, processing the acquired image may include determining a color for each of the different areas that include color changing material.

With the color or color combination determined at 610, method 600 may proceed to 615. At 615, method 600 includes determining whether an expected color or expected color combination is indicated. More specifically, an expected color or expected color combination may correspond to a color or color combination expected when the quick connector is properly secured. In other words, the expected color or color combination may correspond to situations where a female quick connector is effectively secured to a male quick connector. As an example, in a case where the quick connector includes a single area with color changing material, an expected color may be green when the female quick connector is properly secured to the male quick connector. In another example, in a case where the quick connector includes two areas with color changing material, an expected color combination may include a first area corresponding to a first color changing material being green and a second area corresponding to a second color changing material being red, when the female quick connector is properly secured to the male quick connector. Such examples are meant to be illustrative, and other color schemes and color combinations are within the scope of the present disclosure.

Thus, at 615, if the expected color or color combination is not indicated, method 600 may proceed to 620. At 620, method 600 may include indicating an improper connection. In some examples, improper connection may correspond to degradation of the quick connector, such as may be the case after the vehicle has been operated for some amount of time. Indicating improper connection may include storing a result at the computer system as data for interpretation via a technician. In some examples, indicating improper connection may additionally or alternatively include displaying an indication via the display subsystem (e.g. display subsystem 423 at FIG. 4), so as to alert a technician of the improper or degraded connection. In some examples, indicating improper connection may additionally or alternatively include communicating such information to one or more other computing devices (e.g. smartphone, laptop, tablet, etc.) via the communication subsystem (e.g. communication subsystem 424 of FIG. 4), so as to alert a technician of the improper or degraded connection.

With an improper quick connector connection and/or degradation of the quick connector indicated at 620, method 600 may proceed to 625. At 625, method 600 includes indicating a request for mitigating action to be taken. Similar to that discussed above, the request may be via the display subsystem of the computing system and/or communicated to one or more other computing devices via the communication subsystem. Mitigating action may include a technician replacing a particular quick connector, re-securing the particular quick connector, etc. In some examples where a machine is used to replace or re-secure the particular quick connector, the controller may send a signal to a controller of the particular machine for commanding the machine to replace or re-secure the connection. Method 600 may then end.

Returning to 615, in a case where the expected color or color combination is indicated, method 600 may proceed to 630, where proper quick connector connection is indicated. Such a result may be stored as data at the data-holding subsystem (e.g. data-holding subsystem 422 at FIG. 4), for example. In some examples, the result may be displayed via the display subsystem and/or communicated to one or more other computing devices similar to that described above, via the communication subsystem.

Thus, discussed herein a quick connect fitting for coupling a first component of an evaporative emissions system of a vehicle to a second component of the evaporative emissions system, the quick connect fitting may comprise an indicator section that includes a color-changing material that changes color based on an extent of deformation of the color-changing material, where secure coupling of the first component to the second component is dependent on the extent of deformation.

For such a quick connect fitting, the quick connect fitting may be a female quick connect fitting, and the indicator section may be viewable from a position external to the female quick connect fitting. Additionally or alternatively, the quick connect fitting may be a male quick connect fitting, where the indicator section is viewable from a position external to the male quick connect fitting.

For such a quick connect fitting, the extent of deformation may pertain to a length of the color changing material. Additionally or alternatively, the extent of deformation may pertain to a degree of curvature of the color changing material.

For such a quick connect fitting, the color changing material may be of a first color under conditions where the first component is not securely coupled to the second component, and may be of a second color under conditions where the first component is securely coupled to the second component.

The example method discussed above at FIG. 6 pertains to examination via the color vision system of a quick connection in a static state. In other words, the method of FIG. 6 pertains to indicating whether a particular quick connection is properly or improperly connected based on a color or color combination that is not in a process of dynamic change. However, as mentioned above, in some examples color change dynamics during an assembly process of a quick connector may be used to infer proper or improper quick connector securement.

Accordingly, turning now to FIG. 7, an example method 700 is shown for monitoring a dynamic process corresponding to connection of a quick connector in order to infer whether the quick connector is properly assembled (e.g. a female quick connector being effectively secured to a male connector). Method 700 will be described with reference to the systems and components described herein and shown in FIGS. 1-5, though it will be appreciated that similar methods may be applied to other systems and components without departing from the scope of this disclosure. Similar to that discussed above with regard to FIG. 6, instructions for carrying out method 700 may be executed by a computing system, such as computing system 405 of FIG. 4, based on instructions stored in non-transitory memory (e.g. instruction stored at the logic subsystem or controller), and at least in part in conjunction with information retrieved from one or more of camera(s) (e.g. cameras 406 at FIG. 4), camera positional system (e.g. camera positional system 480 at FIG. 4), light positional system (e.g. light positional system 481 at FIG. 4), etc.

Method 700 begins at 705, and includes connecting a female quick connector to a male quick connector. Connecting the female quick connector to the male quick connector may be accomplished via a technician in some examples, or alternatively in other examples may be conducted via a machine (not specifically shown herein), for example a machine associated with an assembly line, a machine used in an automotive repair shop, etc. During the connecting, whether done by a technician or a machine, method 700 may include acquiring a plurality of color images (or in some cases video) of the connection process, so as to determine whether the quick connector is properly connected, as will be elaborated in further detail below. Similar to that discussed above with regard to FIG. 6, the color vision system (e.g. color vision system 400 of FIG. 4) may be used for acquiring the plurality of images (or in some examples video), and color analysis of the plurality of images.

For discussion purposes with regard to FIG. 7, it may be understood that the female quick connector includes one or more areas with color changing materials, while the male quick connector is absent any color changing material. However, it may be understood that examples where the male quick connector additionally or alternatively includes one or more color changing materials are within the scope of this disclosure.

In terms of acquiring the plurality of images it may be understood that at least a first color image or baseline image may be taken of the female quick connector in a state where a color change or color changes have not yet been induced by the connection process. Then, during the connection process, the plurality of color images may be acquired. The acquired images may be stored, for example at the data-holding subsystem (e.g. data-holding subsystem 422), for later processing. In other examples the processing may be done in real-time, as will be discussed in greater detail below.

Accordingly, proceeding to 707, method 700 includes indicating if the process of connecting the female quick connector to the male quick connector is complete. As one example, in the case of a technician connecting the female quick connector to the male quick connector, once the technician believes the connection process to be complete, the technician may enter the information into the computing system in a manner indicating the connection process has been completed. Alternatively, in a machine-based system an electrical communication signal may be communicated to the computing system upon completion of a connection procedure to provide the indication.

In response to the connection process being indicated to be completed, method 700 may proceed to 708. At 708, method 700 may include, via the computer system, processing the plurality of acquired images in order to determine a dynamic pattern of color change associated with the one or more areas of the female quick connector that include color changing material. Similar to that discussed above with regard to FIG. 6, computer vision color detection methodologies may be relied upon for determining the colors and thus color changes that occur during the process of connecting the female quick connector to the male quick connector. For example, a computer program or algorithm may be utilized for processing the plurality of acquired images to infer dynamic color change. With the plurality of images processed and the dynamic pattern of color change corresponding to one or more areas that include color changing material determined, method 700 may proceed to 710.

At 710, method 700 includes determining whether the sequence of color changes determined for the quick connect connection process corresponds to an expected color change sequence or expected color change sequences. In other words, the dynamic pattern of color change associated with one or more areas of the female quick connector that include color changing material may be compared via the computing system to a predetermined dynamic pattern of color change (s). The predetermined dynamic pattern may be a dynamic pattern of color change that is expected when the female quick connector is properly secured to the male quick connector during the quick connector assembly process. A few relevant examples of such dynamic color changes will be discussed in further detail below. It may be understood that the sequence of color changes may include a first sequence corresponding to a first area of the female quick connector that includes color changing material, and a second sequence corresponding to a second area of the female quick connector that includes color changing material. In other examples, where the female quick connector includes just one area of color changing material, the sequence of color changes may simply correspond to the color changes associated with the one area.

If, at 710, it is indicated that the sequence of color changes corresponding to the connection process do not correspond (in other words, are not the same) as those color changes expected for the particular connection process, then method 700 may proceed to 715. At 715, method 700 includes indicating an improper connection. For example, similar to that discussed above at FIG. 6, indicating an improper connection may include storing the result at the computer system as data for interpretation via a technician. In some examples, indicating the improper connection may additionally or alternatively include displaying an indication via the display subsystem (e.g. display subsystem 423 at FIG. 4), so as to alert a technician of the improper or degraded connection. In some examples, indicating improper connection may additionally or alternatively include communicating such information to one or more other computing devices (e.g. smartphone, laptop, tablet, etc.) via the communication subsystem (e.g. communication subsystem 424 of FIG. 4), so as to alert a technician of the improper or degraded connection.

Proceeding to 720, method 700 may include indicating a request for mitigating action to be taken to address the improperly formed connection. The request may in some examples be via the display system of the computing system and/or may be communicated to one or more other computing devices via the communication subsystem. In some examples where the quick connector connection process is conducted via a technician, mitigating action may include the technician replacing the particular quick connector, re-securing the particular quick connector, etc. Alternatively, in an example where the quick connector connection process is conducted via machine-based methodology, the request may in some examples be communicated back to a control system of the machine, with instructions to address the issue of the improperly connected quick connector. Such instructions may include instructions to replace the quick connection, attempt to re-secure the connection, send the particular system back through the assembly line, etc.

Method 700 may then end.

Returning to 710, in a case where the sequence of color changes determined for the quick connect connection process is determined to correspond to the expected color change sequence or sequences (in the case of more than one area of the female quick connector with color changing material), method 700 may proceed to 725. At 725, method 700 may include indicating that a proper secure connection of the female quick connector to the male quick connector has been established. Such a result may be stored as data at the data-holding subsystem, for example. In some examples, the result may be displayed via the display subsystem and/or communicated to one or more other computing devices via the communication subsystem.

As one representative example of how a dynamic color change process may be used for inferring whether a particular quick connector is effectively secured or not, discussion now returns to FIG. 3C. The same numerals as those depicted at FIG. 3C and description corresponding to FIG. 3C will be used for the discussion in order to avoid confusion with regard to the similar discussion above for FIG. 3C. As mentioned, the female quick connector 351 depicted at FIG. 3C includes a flexible portion 353 that includes color changing material. The dashed lines at FIG. 3C define three different sections (first section 361, second section 362, and third section 363) of the flexible portion that includes the color changing material. Due to the shape of the female quick connector and in particular the shape corresponding to the region that includes the color changing material, the color changing material is deformed or stretched to varying degrees. Thus, prior to the act of connecting the female quick connector of FIG. 3C to the male connector 352 of FIG. 3C (refer to part VII of FIG. 3C), the first section 361 may be of a second color, the second section 362 may be of a third color, and the third section 363 may be of a fourth color. In some examples, the second color and the fourth color may be the same due to similar amounts by which the color changing material for the first section and the third section are deformed, but for simplicity of discussion the colors are differentially referred to.

As the connection process is initiated (refer to part VIII of FIG. 3C), flexible portion 353 of the female quick connector 351 deforms in order to receive the male quick connector 352, which results in varying degrees of deformation occurring in the first section 361, second section 362 and third section 363 as compared to one another. Accordingly, first section 361 may change from the second color to become a sixth color, second section 362 may change from the third color to become a seventh color, and third section 363 may change from the fourth color to become an eighth color.

Once the connection process is such that the female quick connector is effectively secured to the male quick connector (refer to part IX of FIG. 3C), flexible portion 353 of the female quick connector 351 returns to a similar conformation as that which the flexible portion 353 adopted prior to the connection process being initiated (refer to part VII of FIG. 3C). Thus, in such an example, the first section 361 returns to the second color, the second section 362 returns to the third color, and the third section 363 returns to the fourth color.

Thus, such a representative example highlights how a dynamic color change process such as that described above with regard to the method of FIG. 7 may be used to infer whether a particular female quick connector has been effectively secured to a male quick connector or not. Specifically, based on a plurality of images taken during the connection process and subsequently analyzed for color changes, if it is indicated that the first section changes from the second color to the sixth color and then back to the second color, while the second section changes from the third color to the seventh color and then back to the third color, and while the third section changes from the fourth color to the eighth color and then back to the fourth color, it may be determined that the quick connector was properly assembled. In such an example, simply relying on a static image of a connected quick connector may be difficult, as the color scheme corresponding to the first, second, and third sections is the same regardless of whether the female quick connector is effectively secured to the male quick connector or not. However, as discussed with regard to FIG. 3C above, including another area of a color changing material (e.g. first color changing material 356 at FIG. 3C) that is one color when not connected and another color when connected can allow for reliance on a static image to infer whether the quick connector is properly connected (e.g. where the first section 361 is of the second color, where the second section 362 is of the third color, where the third section 363 is of the fourth color, and where the first color changing material 356 is of the ninth color as discussed above with regard to FIG. 3C). Thus, it is herein recognized that in some examples it may be beneficial to include two areas of color changing material in order to enable both dynamic monitoring of a quick connector connection process and static imaging of whether a quick connector is effectively secured or not.

Other types of color changes associated with color changing materials are within the scope of this disclosure for serving as a means for dynamically monitoring a connection process of quick connectors. As one example, a color change associated with a twisting motion of an aspect of a quick connector may be used as an indicator of proper or improper connection.

Thus, discussed herein, a method of monitoring manufacture of a vehicle evaporative emissions system may include, via a computing system of a color vision system, the computing system storing instructions in non-transitory memory, obtaining a first color image of a first quick connector fitting prior to the first quick connector fitting being connected to the second quick connector fitting. The instructions may further include receiving an indication that the first quick connector fitting has been connected to the second quick connector fitting. The instructions may further include obtaining a final color image of the first quick connector fitting responsive to receiving the indication. Via the computing system, the instructions may further include processing the first color image and the final color image to determine an actual color change between the first color image and the final color image and comparing the actual color change to an expected color change. The instructions may further include, in response to the actual color change differing from the expected color change, providing an indication that the first quick connector fitting is not properly secured to the second quick connector fitting and providing a request for mitigating action to be taken to properly secure the first quick connector to the second quick connector.

For such a method, the first quick connector fitting may include a color change material that changes color in response to deformation of the color change material. Deformation of the color change material may occur in response to the first quick connector fitting physically interacting with the second quick connector fitting, for example. Additionally or alternatively, deformation of the color change material may occur in response to tension being applied to the first quick connector fitting in order to secure the first quick connector fitting to the second quick connector fitting.

In one example of such a method, the first quick connector fitting is a female quick connector fitting and the second quick connector fitting is a male quick connector fitting. In another example, the first quick connector fitting is a male quick connector fitting and the second quick connector is a female quick connector fitting.

For such a method, the method may further comprise obtaining a plurality of color images between the first color image and the final color image. In such an example, via the computing system the method may include processing the plurality of color images to determine an actual dynamic color change over time corresponding to the actual color change. In such an example, comparing the actual color change to the expected color change may include comparing the actual dynamic color change to an expected dynamic color change. In one example, processing the plurality of color images to determine the actual color dynamic color change may include, via the computing system, processing the plurality of color images at a frame rate at which the plurality of color images are acquired. In another example, processing the plurality of color images may occur in response to receiving the indication that the first quick connector fitting has been connected to the second quick connector fitting.

For such a method, connecting the first quick connector fitting to the second quick connector fitting may be carried out by a machine. In such an example, the machine may receive instructions for connecting the first quick connector fitting to the second quick connector fitting via a control system that stores such instructions in non-transitory memory.

For such a method, the request for mitigating action may include a request to attempt to reconnect the first quick connector fitting to the second quick connector fitting.

Turning now to FIG. 8, an example timeline 800 is shown depicting dynamic color changes occurring in a first section, a second section and a third section of a female quick connector (e.g. female quick connector 351 at FIG. 3C), where the first section, the second section and the third section are of a similar nature to that discussed above with regard to FIG. 3C. While FIG. 3C is discussed as also including another color changing material (e.g. first color changing material 356 at FIG. 3C), for discussion purposes just the first section, second section and third sections are referred to for timeline 800. The top plot includes expected color changes corresponding to the first section 805 (e.g. 361 at FIG. 3C), second section 810 (e.g. 362 at FIG. 3C), and third section 815 (e.g. 363 at FIG. 3C) when the female quick connector is being connected to the male quick connector (e.g. male quick connector 352 at FIG. 3C), over time. Expected color changes vary between yellow (Y), green (G) and blue (B). However, it may be understood that such an example is illustrative, and thus expected color changes may vary between a first color, a second color and a third color, broadly speaking. The middle plot includes actual color changes as inferred based on a plurality of images acquired via the color vision system (e.g. color vision system 400 at FIG. 4) during the process of connecting the female quick connector, the plurality of images processed via the computing system (e.g. computing system 405 at FIG. 4) in order to reveal dynamic changes in color associated with the three different sections of the female quick connector, over time. Specifically, the middle plot includes actual color changes corresponding to the first section 820, the second section 825, and the third section 830. Again, color changes may vary between yellow, green and blue in this example timeline 800. The bottom plot includes line 835, indicating whether a proper connection of the female quick connector to the male quick connector has been determined (yes, no, or non-applicable). For example timeline 800, it may be understood that the connecting of the female quick connector to the male quick connector may be conducted via a machine or a technician. It may be further understood that in this example timeline 800, the plurality of images are acquired during the connection process of the quick connector, and then processed (e.g. offline processing) via the computing system to reveal the color change dynamics depicted graphically at timeline 800. However, in other examples the dynamic color changes may be determined in real-time, where real-time may be understood to mean that the color determination algorithm or program used via the computing system may run at the rate of the source (e.g. camera 406 at FIG. 4) supplying the images. In other words, the program or algorithm may process images at the frame rate of the camera.

At time t0, the process of connecting the female quick connector to the male quick connector has not yet begun. Expected color of the first section is blue, expected color of the second section is green, and expected color of the third section is yellow. The actual color determined via the color vision system corresponds to the expected color at time t0.

Between time t0 and t1, as the connection process takes place, color changes corresponding to the area of the female quick connector that includes the color changing material take place due to deformation (e.g. tension, contraction) of the color changing material. The actual color changes that occur during the connection process are similar to the expected color changes between time t0 and t1. At time t1, the actual color of the first section 820 is green, the actual color of the second section 825 is yellow, and the actual color of the third section is blue, similar to the expected color of the first section 805, second section 810 and third section 815. It may be understood that time t1 may be of a similar nature as that discussed in greater detail above at part VIII of FIG. 3C.

Between time t1 and t2, further color changes take place as the connection process continues. The actual color changes that occur during the connection process between time t1 and t2 are similar to the expected color changes between time t1 and t2. At time t2, the actual color of the first section 820 is blue, the actual color of the second section 825 is green, and the actual color of the third section 830 is yellow, similar to the expected color of the first section 805, second section 810 and third section 815. It may be understood that time t2 may be of a similar nature as that discussed above at part IX of FIG. 3C.

Because the actual color changes of the three sections of the female quick connector are similar to the expected color changes during the process of connecting the quick connector, at time t2 it is indicated that the connection process has been correctly carried out. In other words, a proper connection is indicated at time t2 (refer to plot 835).

Example timeline 800 depicts just one representative example of a color change sequence for a color changing material included as part of a female quick connector, as the female quick connector is being attached to a male quick connector. It will be appreciated that, for example timeline 800, proper connection may be inferred based on the color change dynamics that occur during the connection process. However, because example timeline 800 depicts a situation where a static image at time t0 (where the quick connector is disconnected) may reveal the same color patterning as a static image at time t2 (where the quick connector is effectively secured), such a design may not be desirable on its own for determining whether a quick connector is secured in the absence of connection dynamics. Thus, in such an example, it may be desirable to include a second area (for example first color changing material 356 at FIG. 3C) of color changing material as part of the quick connector that displays one color when the quick connector is disconnected and another color when the quick connector is properly connected.

Proceeding to FIG. 9, another example timeline 900 is shown depicting dynamic color changes that occur in a color changing material included as part of a female quick connector as the female quick connector is being connected to a male quick connector. For descriptive purposes, it may be understood that the female quick connector may be of a similar nature as that depicted at FIG. 2 (e.g. female quick connector 210 at FIG. 2), where the female quick connector includes a color changing material (e.g. color changing material 212) that is of a first length (e.g. first length 221 at FIG. 2) when the quick connector is disconnected from a male quick connector (e.g. 205), and where the color changing material is of a second length (e.g. second length 252 at FIG. 2) when the quick connector is effectively secured (properly connected). In this example timeline 900, when the color changing material is of the first length, the color changing material is a first color, and when the color changing material is of the second length, the color changing material is a second color.

The top plot of example timeline 900 includes expected color changes 905 corresponding to the color changing material, over time, and the middle plot includes actual color changes 910 corresponding to the color changing material, over time. The bottom plot includes line 915, indicating whether a proper quick connector connection is inferred (yes, no, or non-applicable), over time. Similar to that discussed above for FIG. 8, in this example timeline 900 expected and actual color changes vary between yellow (Y), green (G) and blue (B). Furthermore, similar to that discussed above for FIG. 8, actual color changes are inferred based on a plurality of images acquired via the color vision system during the process of connecting the female quick connector to the male quick connector, to reveal dynamic changes in color as the quick connector is being connected. Furthermore, it may be understood that for this example timeline 900, the process of connecting the female quick connector to the male quick connector may be carried out via a machine or a technician. Still further, it may be understood that the plurality of images are acquired during the connection process of the quick connector and are then processed (e.g. offline processing) via the computing system to reveal the color change dynamics depicted graphically at timeline 900. However, in other examples the dynamic color changes may be determined in real-time, where real-time may be understood to mean that the color determination algorithm or program used via the computing system may run at the rate of the source (e.g. camera 406 at FIG. 4) supplying the images. In other words, the program or algorithm may process images at the frame rate of the camera.

At time t0, it may be understood that the quick connector connection process has not yet begun. The actual color 910 of the color changing material included as part of the female quick connector is yellow, consistent with the expected color 905. Between time t0 and t1, the process of connecting the female quick connector to the male quick connector begins taking place, and accordingly, dynamic color changes of the color changing material occur. It may be understood that, similar to that discussed above at FIG. 2, the dynamic color changes are due to tension being applied to the female quick connector, thus deforming (e.g. stretching) the color changing material. By time t1 the actual color 910 of the color changing material has become green, consistent with the expected color 905. However, between time t1 and t2, the actual color remains substantially green, whereas by time t2 the expected color 905 is blue. Thus, at time t2 it is inferred that a proper connection (refer to line 915) has not been established. If a proper connection were to have taken place, then the actual color of the quick connector would have been blue, consistent with the expected color.

While timeline 900 is discussed with regard to monitoring a dynamic color change process in order to infer whether the quick connector is properly assembled, it may be understood that it also depicts a circumstance where, once connected, a static image may be used to infer whether the quick connector is connected or disconnected. Specifically, because the color changing material is of a first color when disconnected and a second color when properly connected, a static image may be sufficient to infer the state of the quick connector (e.g. connected or disconnected).

In this way, determination as to whether quick connectors that tie together various aspects of a vehicle evaporative emissions system are properly secured may be improved as compared to current manual or machine-vision approaches that rely solely on depth measurements or other means of inferring proper connection.

The technical effect of incorporating color changing material into a quick connector for monitoring purposes is that static images and/or dynamic imaging may be relied upon for inferring proper or improper connection. Specifically, as opposed to relying on depth of insertion of a male quick connector into a female quick connector or an indication that a redundant latch has been properly closed, the methodologies discussed herein rely on robust color determination to infer proper or improper quick connector status. Color determination may be less prone to error than other approaches that rely on depth of insertion or determination of redundant latch status, for various reasons. Specifically, color determination methodologies may be less dependent on precise alignment of portions of vehicle systems where the quick connectors are included, as compared to methodologies that rely on depth measurements, for example. By improving a manner in which quick connectors may be determined to be improperly connected, warranty issues pertaining to improperly connected quick connectors may be reduced, release of undesired evaporative emissions or other undesired emissions to the atmosphere may be reduced, time spent on repairs (and thus overall costs) may be reduced, and customer satisfaction may be improved.

The systems, methods and quick connectors discussed herein may enable one or more systems, one or more methods and one or more quick connectors. In one example, a quick connect fitting for coupling a first component of an evaporative emissions system of a vehicle to a second component of the evaporative emissions system is disclosed, the quick connect fitting comprising: an indicator section that includes a color-changing material that changes color based on an extent of deformation of the color-changing material, where secure coupling of the first component to the second component is dependent on the extent of deformation. In a first example, the quick connect fitting is a female quick connect fitting; and wherein the indicator section is viewable from a position external to the female quick connect fitting. A second example of the quick connect fitting optionally includes the first example, and further includes wherein the extent of deformation pertains to a length of the color changing material. A third example of the quick connect fitting optionally includes any one or more or each of the first through second examples, and further includes wherein the extent of deformation pertains to a degree of curvature of the color changing material. A fourth example of the quick connect fitting optionally includes any one or more or each of the first through third examples, and further includes wherein the color changing material is of a first color under conditions where the first component is not securely coupled to the second component; and wherein the color changing material is of a second color under conditions where the first component is securely coupled to the second component. A fifth example of the quick connect fitting optionally includes any one or more or each of the first through fourth examples, and further includes where the quick connect fitting is a male quick connect fitting; and wherein the indicator section is viewable from a position external to the male quick connect fitting.

An example of a method of monitoring manufacture of a vehicle evaporative emissions system comprises, via a computing system of a color vision system, the computing system storing instructions in non-transitory memory, obtaining a first color image of a first quick connector fitting prior to the first quick connector fitting being connected to a second quick connector fitting; receiving an indication that the first quick connector fitting has been connected to the second quick connector fitting; obtaining a final color image of the first quick connector fitting responsive to receiving the indication; and via the computing system, processing the first color image and the final color image to determine an actual color change between the first color image and the final color image; comparing the actual color change to an expected color change; and in response to the actual color change differing from the expected color change, providing an indication that the first quick connector fitting is not properly secured to the second quick connector fitting and providing a request for mitigating action to be taken to properly secure the first quick connector to the second quick connector. In a first example of the method, the method further includes wherein the first quick connector fitting includes a color change material that changes color in response to deformation of the color change material. A second example of the method optionally includes the first example, and further includes wherein deformation of the color change material occurs in response to the first quick connector fitting physically interacting with the second quick connector fitting. A third example of the method optionally includes any one or more or each of the first through second examples, and further includes wherein deformation of the color change material occurs in response to tension being applied to the first quick connector fitting in order to secure the first quick connector fitting to the second quick connector fitting. A fourth example of the method optionally includes any one or more or each of the first through third examples, and further includes wherein the first quick connector fitting is a female quick connector fitting; and wherein the second quick connector fitting is a male quick connector fitting. A fifth example of the method optionally includes any one or more or each of the first through fourth examples, and further includes wherein the first quick connector fitting is a male quick connector fitting; and wherein the second quick connector fitting is a female quick connector fitting. A sixth example of the method optionally includes any one or more or each of the first through fifth examples, and further comprises obtaining a plurality of color images between the first color image and the final color image; via the computing system, processing the plurality of color images to determine an actual dynamic color change over time corresponding to the actual color change; and wherein comparing the actual color change to the expected color change includes comparing the actual dynamic color change to an expected dynamic color change. A seventh example of the method optionally includes any one or more or each of the first through sixth examples, and further includes wherein processing the plurality of color images to determine the actual dynamic color change includes, via the computing system, processing the plurality of color images at a frame rate at which the plurality of color images are acquired. An eighth example of the method optionally includes any one or more or each of the first through seventh examples, and further includes wherein processing the plurality of color images occurs in response to receiving the indication that the first quick connector fitting has been connected to the second quick connector fitting. A ninth example of the method optionally includes any one or more or each of the first through eighth examples, and further includes wherein connecting the first quick connector fitting to the second quick connector fitting is carried out by a machine. A tenth example of the method optionally includes any one or more or each of the first through ninth examples, and further includes wherein the request for mitigating action includes a request to attempt to reconnect the first quick connector fitting to the second quick connector fitting.

An example of a color vision system for determining whether a first quick connector fitting is properly secured to a second quick connector fitting, the color vision system comprises one or more color cameras; and a computing system, the computing system storing instructions for: acquiring a set of color images of the first quick connector fitting via the one or more color cameras during a process whereby the first quick connector fitting is connected to the second quick connector fitting; processing the set of color images in order to determine an actual dynamic color change over time that occurs while the first quick connector fitting is connected to the second quick connector fitting; comparing the actual dynamic color change to an expected dynamic color change; in response to the actual dynamic color change correlating with the expected dynamic color change based on comparing the actual dynamic color change to the expected dynamic color change, providing an indication that the first quick connector fitting is properly secured to the second quick connector fitting; and in response to the actual dynamic color change differing from the expected dynamic color change based on comparing the actual dynamic color change to the expected dynamic color change, providing a request to reconnect the first quick connector fitting to the second quick connector fitting. In a first example of the color vision system, processing the set of color images to determine the actual dynamic color change and comparing the actual dynamic color change to the expected dynamic color change occurs while the first quick connector fitting is being connected to the second quick connector fitting; and wherein the request to reconnect the first quick connector fitting occurs at any time while the first quick connector fitting is being connected to the second quick connector fitting. A second example of the color vision system optionally includes the first example, and further comprises a display system, wherein the computing system stores further instructions to provide the indication that the first quick connector fitting is properly secured to the second quick connector fitting or to provide the request to reconnect the first quick connector fitting to the second quick connector fitting via the display subsystem.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A quick connect fitting for coupling a first component of an evaporative emissions system of a vehicle to a second component of the evaporative emissions system, the quick connect fitting comprising:
   an indicator section that includes a color-changing material that changes color based on an extent of deformation of the color-changing material, where secure coupling of the first component to the second component is dependent on the extent of deformation;
   wherein the color-changing material is of a first color under conditions where the first component is not securely coupled to the second component; and
   wherein the color changing material is of a second color under conditions where the first component is securely coupled to the second component.

2. The quick connect fitting of claim 1, where the quick connect fitting is a female quick connect fitting; and
   wherein the indicator section is viewable from a position external to the female quick connect fitting.

3. The quick connect fitting of claim 1, wherein the extent of deformation pertains to a length of the color changing material.

4. The quick connect fitting of claim 1, wherein the extent of deformation pertains to a degree of curvature of the color changing material.

5. The quick connect fitting of claim 1, where the quick connect fitting is a male quick connect fitting; and
   wherein the indicator section is viewable from a position external to the male quick connect fitting.

6. A method of monitoring manufacture of a vehicle evaporative emissions system, the method comprising:
   via a computing system of a color vision system, the computing system storing instructions in non-transitory memory, obtaining a first color image of a first quick connector fitting prior to the first quick connector fitting being connected to a second quick connector fitting;
   receiving an indication that the first quick connector fitting has been connected to the second quick connector fitting;

obtaining a final color image of the first quick connector fitting responsive to receiving the indication; and via the computing system, processing the first color image and the final color image to determine an actual color change between the first color image and the final color image;

comparing the actual color change to an expected color change; and in response to the actual color change differing from the expected color change, providing an indication that the first quick connector fitting is not properly secured to the second quick connector fitting and providing a request for mitigating action to be taken to properly secure the first quick connector to the second quick connector.

7. The method of claim 6, wherein the first quick connector fitting includes a color change material that changes color in response to deformation of the color change material.

8. The method of claim 7, wherein deformation of the color change material occurs in response to the first quick connector fitting physically interacting with the second quick connector fitting.

9. The method of claim 7, wherein deformation of the color change material occurs in response to tension being applied to the first quick connector fitting in order to secure the first quick connector fitting to the second quick connector fitting.

10. The method of claim 6, wherein the first quick connector fitting is a female quick connector fitting; and
    wherein the second quick connector fitting is a male quick connector fitting.

11. The method of claim 6, wherein the first quick connector fitting is a male quick connector fitting; and
    wherein the second quick connector fitting is a female quick connector fitting.

12. The method of claim 6, further comprising obtaining a plurality of color images between the first color image and the final color image;
    via the computing system, processing the plurality of color images to determine an actual dynamic color change over time corresponding to the actual color change; and
    wherein comparing the actual color change to the expected color change includes comparing the actual dynamic color change to an expected dynamic color change.

13. The method of claim 12, wherein processing the plurality of color images to determine the actual dynamic color change includes, via the computing system, processing the plurality of color images at a frame rate at which the plurality of color images are acquired.

14. The method of claim 12, wherein processing the plurality of color images occurs in response to receiving the indication that the first quick connector fitting has been connected to the second quick connector fitting.

15. The method of claim 6, wherein connecting the first quick connector fitting to the second quick connector fitting is carried out by a machine.

16. The method of claim 6, wherein the request for mitigating action includes a request to attempt to reconnect the first quick connector fitting to the second quick connector fitting.

17. A color vision system for determining whether a first quick connector fitting is properly secured to a second quick connector fitting, the color vision system comprising:

one or more color cameras; and a computing system, the computing system storing instructions for:
    acquiring a set of color images of the first quick connector fitting via the one or more color cameras during a process whereby the first quick connector fitting is connected to the second quick connector fitting;
    processing the set of color images in order to determine an actual dynamic color change over time that occurs while the first quick connector fitting is connected to the second quick connector fitting;
    comparing the actual dynamic color change to an expected dynamic color change;
    in response to the actual dynamic color change correlating with the expected dynamic color change based on comparing the actual dynamic color change to the expected dynamic color change, providing an indication that the first quick connector fitting is properly secured to the second quick connector fitting; and
    in response to the actual dynamic color change differing from the expected dynamic color change based on comparing the actual dynamic color change to the expected dynamic color change, providing a request to reconnect the first quick connector fitting to the second quick connector fitting.

18. The color vision system of claim 17, wherein processing the set of color images to determine the actual dynamic color change and comparing the actual dynamic color change to the expected dynamic color change occurs while the first quick connector fitting is being connected to the second quick connector fitting; and
    wherein the request to reconnect the first quick connector fitting occurs at any time while the first quick connector fitting is being connected to the second quick connector fitting.

19. The color vision system of claim 17, further comprising a display subsystem; and
    wherein the computing system stores further instructions to provide the indication that the first quick connector fitting is properly secured to the second quick connector fitting or to provide the request to reconnect the first quick connector fitting to the second quick connector fitting via the display subsystem.

20. A quick connect fitting for coupling a first component of an evaporative emissions system of a vehicle to a second component of the evaporative emissions system, the quick connect fitting comprising:

an indicator section that includes a color-changing material that changes color based on an extent of deformation of the color-changing material, where secure coupling of the first component to the second component is dependent on the extent of deformation, and wherein the color-changing material is attached to the quick connect fitting via an adhesive.

* * * * *